(12) United States Patent
Zukowski et al.

(10) Patent No.: US 9,275,027 B2
(45) Date of Patent: Mar. 1, 2016

(54) METHOD AND SYSTEM FOR COLLABORATIVE CAPTURE AND REPLAY OF DIGITAL MEDIA FILES USING MULTIMODAL DOCUMENTS

(75) Inventors: Deborra J. Zukowski, Newtown, CT (US); Jean-Hiram Coffy, Norwalk, CT (US); Richard W. Heiden, Shelton, CT (US); Arthur J. Parkos, Southbury, CT (US)

(73) Assignee: Pitney Bowes Inc., Stamford, CT (US)

( * ) Notice: Subject to any disclaimer, the term of this patent is extended or adjusted under 35 U.S.C. 154(b) by 2681 days.

(21) Appl. No.: 11/846,160

(22) Filed: Aug. 28, 2007

(65) Prior Publication Data

US 2008/0236904 A1  Oct. 2, 2008

Related U.S. Application Data

(60) Provisional application No. 60/909,281, filed on Mar. 30, 2007, provisional application No. 60/909,273, filed on Mar. 30, 2007.

(51) Int. Cl.
*G06F 3/00* (2006.01)
*G06F 17/24* (2006.01)

(52) U.S. Cl.
CPC .................................. *G06F 17/241* (2013.01)

(58) Field of Classification Search
CPC ..................................................... G06F 17/241
USPC .................................. 715/234, 243, 254, 255
See application file for complete search history.

(56) References Cited

U.S. PATENT DOCUMENTS

| | | | |
|---|---|---|---|
| 5,243,149 A * | 9/1993 | Comerford et al. | 178/18.03 |
| 5,897,643 A | 4/1999 | Matsumoto | 707/511 |
| 6,027,026 A | 2/2000 | Husain et al. | 235/487 |
| 6,148,312 A | 11/2000 | Paik et al. | 707/530 |
| 6,590,837 B1 | 7/2003 | Kaplan | 369/25.01 |
| 6,839,707 B2 | 1/2005 | Lee et al. | 707/8 |
| 7,551,300 B2 | 6/2009 | Wolfman et al. | |
| 7,609,862 B2 * | 10/2009 | Black | 382/124 |

OTHER PUBLICATIONS

"A Multimedia Document Filing System", by Xien Fan, Qianhong Liu, Peter A. Ng.
The Audio Notebook, "Paper and Pen Interaction with Structured Speech," by Lisa Stifelman, Barry Arons, Chris Schmandt.
"Smart-ITS Friends: A Technique for Users to Easily Establish Connections Between Smart Artefacts," by Lars Eric Holmquist, Friedmann Mattern, Bernt Schiele, Petteri Alahuhta, Michael Beigl, Hans-W. Gellerson.
U.S. Appl. No. 11/156,127, filed Jun. 17, 2006, B.D. Singer et al.

* cited by examiner

*Primary Examiner* — Kyle Stork
(74) *Attorney, Agent, or Firm* — Steven J. Shapiro; Charles R. Malandra, Jr.

(57) ABSTRACT

A system and method for enabling capture and replay of digital media files using multimodal documents including a context manager for managing multimodal documents with a virtual media content management system coupled to the context manager. The virtual media content management system contains digital content which is adapted to be managed by the virtual media content management system. An input system is coupled to the context manager and includes a stylus operable to select digital content to be processed. The context manager is operable to issue multimodal document management instructions to the virtual media content management system to process digital content selected by the stylus based on input information from the input system.

21 Claims, 17 Drawing Sheets

METHOD AND SYSTEM FOR COLLABORATIVE CAPTURE AND REPLAY OF DIGITAL MEDIA FILES USING MULTIMODAL DOCUMENTS

RELATED APPLICATIONS

This application claims the benefit under 35 U.S.C. 119(e) of U.S. provisional patent applications: Ser. No. 60/909,281 filed Mar. 30, 2007, and entitled "A METHOD AND SYSTEM FOR ENABLING COLLABORATIVE CAPTURE AND REPLAY OF DIGITAL MEDIA FILES USING PHYSICAL DOCUMENTS"; and Ser. No. 60/909,273 filed Mar. 30, 2007, and entitled "SYSTEMS AND METHODS FOR MANAGING MULTIMODAL DOCUMENTS." Both provisional patent applications are incorporated herein by reference.

FIELD OF THE INVENTION

The invention relates generally to multimodal documents and more particularly to systems and methods for enabling collaborative capture and replay of digital media files using multimodal documents, including managing annotations of multimodal documents.

BACKGROUND OF THE INVENTION

When reviewing documents, especially long ones, readers tend to print the document and mark it up. In doing so, the only mechanism they have for adding comments is to write out the comments on the paper. Often times, they may have views about the material that they do not write since they do not fit well on the document. These views would be able to be attached to the document if the paper was able to capture/record the spoken word, but paper does not. The handling of documents is also complicated by the multimedia and distributed nature of documents in our environment. Multimedia documents are documents that contain or are associated with different types of content or media. For example, a document may exist which could consist of word-processing content, video annotations, or other types of media. This media although associated with the document, is not necessarily embedded in the document and can be found in multiple locations throughout the environment.

In addition to the above, paper is ubiquitous. It is used, for example, in areas as diverse as offices, lecture halls, cars, and dining tables. Paper has been the subject of research in ubiquitous computing interface technologies, both in terms of enhancement and replacement. Some researchers have augmented paper with barcodes, radio frequency identification tags (RFIDs), and other technologies to better identify a document or product and its metadata and to enable the transfer of that information from paper to digital systems. Others are developing paper-like devices, e.g., eInk, which is a paper-like digital display technology, and enhancing more traditional electronic devices with paper-like interaction mechanisms, e.g., pen-based tablets, in an attempt to diminish our reliance on paper that does not intrinsically communicate with the enveloping computing infrastructure.

Various systems have been developed for handling and annotating documents including multimedia documents. For example, U.S. Pat. No. 5,243,149 for METHOD AND APPARATUS FOR IMPROVING THE PAPER INTERFACE TO COMPUTING discloses a unified system comprised of a digitized pen/paper interface and voice recorder for a single user to create annotations (including voice). An article entitled "The Audio Notebook" by Lisa Stifelman, Barry Arons and Chris Schmandt of MIT Media Laboratory and published in the Proceedings of the SIGCHI conference on Human factors in computing systems, p. 182-189, March 2001, Seattle, Wash., United States, is comparable to the U.S. Pat. No. 5,243,149, with emphasis on audio indexing of a lecture, using hand-written notes. U.S. Pat. No. 6,027,026 for DIGITAL AUDIO RECORDING WITH COORDINATED HANDWRITTEN NOTES and U.S. Pat. No. 6,590,837 for APPARATUS AND METHOD FOR ANNOTATING AN OBJECT WITH AN AUDIO MESSAGE disclose apparatus that associated a voice recording to a particular document. These apparati each include a recorder for starting recordings and stopping recordings, file the recordings, and associate the recordings with a document via a barcode that uniquely identifies the document. Other systems such as tablet software with pen-based inputs from various vendors provide purely electronic annotation as does the Adobe PDF PC application with voice annotation. The paper entitled, "Smart-its Friends: A Technique for Users to Easily Establish Connections between Smart Artifacts," and published in the Proceedings of the Ubicomp Ubiquitous Computing Conference, p. 116-122, September 2001, Atlanta Ga., United States, provides a hardware-assisted pairing mechanism that can be used to create a system out of otherwise unconnected devices.

U.S. Pat. No. 5,243,149 (assigned to International Business Machines Corp.) discloses an apparatus and system for associating annotations, both ink and voice with document pages. The page can be scanned, using a detachable scanner, and stored in a content file. A control file is associated with the content file. Ink strokes are stored and voice recordings can be made, using an explicit start. The entire voice stream is also stored in a file. The control file is augmented with links to the annotation files. All files can be updated for post processing, to digitally display the document with annotations, process the annotations, to add to the content, etc.

Current systems support pen-based annotations using internal media sources. The device acts as a tape recorder, with the user needing to explicitly audibly speak, for example, record. Voice and pen strokes are associated in a post-processing fashion, by converting pen strokes into indexes for the audio stream. Files include a scanned image of the document, audio stream, and index file over a network. The various prior systems that have been developed for annotating documents, including multimedia documents, do not provide sufficient flexibility in how annotations are handled. These systems also do not facilitate handling a range of annotation media types and multimedia document types, including multiple versions of multimedia document types—both digital and physical, that may have been or will in the future be annotated.

SUMMARY OF THE INVENTION

It is an object of the present invention to provide a flexible environment for managing annotations of multimodal documents and to facilitate the use of such systems by individuals or groups of individuals.

It is also an object of the present invention to support using paper documents and to extend digital information about the document and its modification, annotation and cloning.

It is a further object of the present invention to provide a flexible system for annotating multimodal documents with annotations gained from accessing data streams that may come from various and different types of media sources.

It is yet another object of the present invention to enable dynamic pairing of media sources with an input stylus where the, pairing, as desired, is of a media source to only one stylus, or of a media source to many styli.

It is still a further object of the present invention to support renderings across different versions of documents, both multiple physical and electronic, and also provide access to various types of annotations to the various versions.

It is yet further objects of the present invention to enable documents to be shared without having to share complete media annotation streams, such as audio streams.

A system for enabling capture and replay of digital media files using multimodal documents embodying the present invention includes a context manager for managing multimodal documents with a virtual media content management system coupled to the context manager. The virtual media content management system contains digital content which is adapted to be managed by the virtual media content management system. An input system is coupled to the context manager and includes a stylus operable to select digital content to process. The context manager is operable to issue multimodal document management instructions to the virtual media content management system to process digital content selected by the stylus based on input information from the input system.

A method for enabling capture and replay of digital media files using multimodal documents embodying the present invention includes the steps of associating an annotation device with a user and creating an annotation object. That an annotation object has been created is broadcast to an operating environment and a media clip is created. The media clip is associated with the annotation object and the association of the media clip with the annotation object is reported to the operating environment.

A method for enabling replay of digital media files using multimodal documents embodying the present invention includes the steps of associating an annotation selection device with a user and selecting an annotation enabled space for rendering an annotation. The selection of the annotation enabled space is reported to the operating environment and the annotation content of the annotation enabled space is determined. Activation of the annotation content is requested and the annotation content is rendered.

BRIEF DESCRIPTION OF THE DRAWINGS

The accompanying drawings, which are incorporated in and constitute a part of the specification, illustrate presently preferred embodiments of the invention. The drawings together with the general description given above and the detailed description of the preferred embodiments given below, serve to explain the principles of the invention. As shown throughout the drawings, like reference numerals designate like or corresponding parts in the various figures, in which.

DETAILED DESCRIPTION OF THE PREFERRED EMBODIMENT

Figure 1:
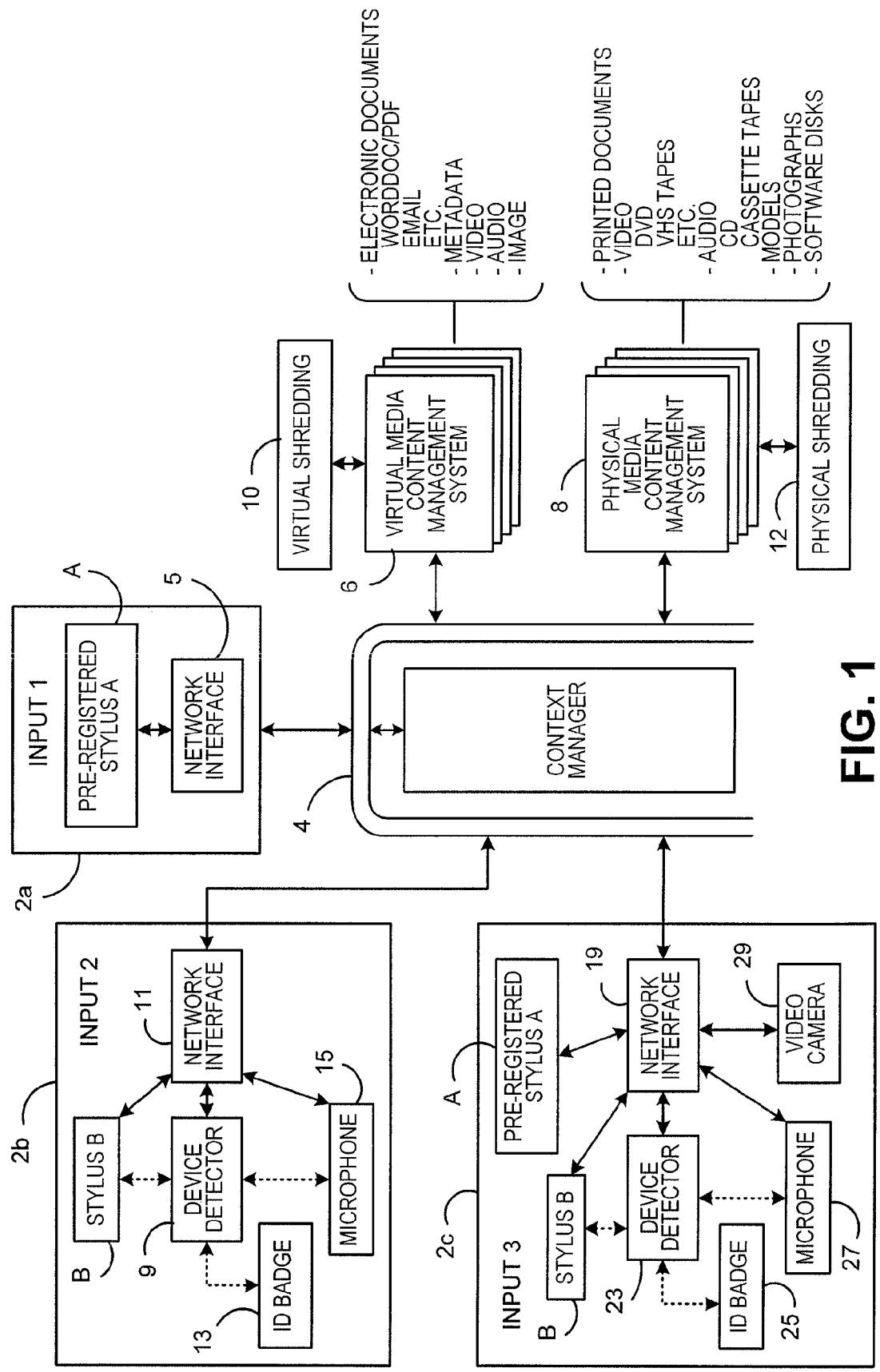
FIG. 1 is a block diagram of a system for enabling collaborative capture and replay of digital media files using multimodal documents embodying the present invention.

Various terms used herein have the meaning and usage set out below.

Multimodal documents include all forms and types of information. While multimodal documents are often physical documents and related virtual information, it also includes both virtual media and physical media. Virtual media, for example, include electronic versions of documents, e-mails, and metadata stored in memory of various types, electronic versions of video information stored in various forms, electronic versions of audio information stored in various forms and software stored in various electronic forms. Physical media, for example, include printed documents, media containing video information (DVDs, tapes, etc.), media containing audio information (CDs, tapes, etc.), physical models, photographs, and software disks. Multimodal documents content may be rendered, for example, in complete documents, artifacts, and parts thereof that can exist in paper or electronic form. Virtual media and physical media are often related in that, for example, a printed document with hand written annotations (physical media) thereon may be electronically stored (virtual media). These media, the physical media and the virtual media, are related in that they involve the same or similar information or information that has been modified. For example, an electronic copy of an engineering drawing (virtual media) and the physical embodiment depicted in the engineering drawing (physical media) are both related in the information they convey.

Information domains are the various environments in which the virtual media and the physical media exist and are managed.

Domains of control are the various systems and/or subsystems, such as a content management server (server and associated software), responsible for control of a certain set of information such as video files, audio files, document metadata, or physical and/or electronic renderings of a document.

Information and content data is the complete set of data including content, use and domains of a multimodal document including virtual media and physical media; essentially a bucket of data pertaining to the multimodal document. The data, typically a list of elements, can be stored in a file or a database or otherwise. Herein, the phrase information and content data file (ICDF) is intended to encompass all of the foregoing.

Shredding includes the deletion of virtual media and the destruction of physical media, as the case may be.

Stylus is any device or other means that can be observed in the operating environment that is used to select across both space and/or time digital content to processed. For example, as used herein a stylus includes a digital pen, a camera and pencil combination, a gesture (hand wave or pointing), a stroke on a pressure or heat sensitive screen or medium such as a film over laying a physical piece of paper or other technology that can be employed to delimit the extent of an annotation such that it designates, for example, when and/or where an annotation starts, when and/or where an annotation ends and where such annotation is located with respect to a multimodal document, clone and/or other annotation.

The following is an overview of aspects of the operation of the system shown in FIGS. 1-17.

Annotations are gained from accessing data streams from media sources (e.g., room cameras and microphones, environmental sensors, etc.). Dynamic pairing of media sources with input stylus, such as a digitized pen input, enable the support of pairing, as desired, of a media source to only one stylus, or pairing of a media source to many styli; as for example, where the media source is a microphone in the middle of a table, every person at the table can pair his/her stylus with the microphone device capturing the audio stream. A stylus may be pre-registered to a user or a group of users such as a department. A stylus that is not pre-registered to any user may be registered to a user or a group of users for the duration of an input session or for a defined time period.

Rather than having annotations associated with only electronic documents or with a single physical document which always carry all annotations, annotated renderings are supported by the system, where desired, across different versions of documents, both multiple physical and electronic. The system also provides access to various types of annotations such as, for example, ink annotations as displayed by the paper and voice annotations indicated via a stylized mark.

Clips of interest can be created and a mark associated with an annotation such as a voice clip that comprises the contents of the annotation. This aspect is very powerful in that documents can be shared without having to share complete audio streams. Annotations are integrated in a manner that assists more natural document-based interactions, helping to reduce quiescence (time outs) to deduce the annotation stop point. The annotations of the present system can be reassigned as to where they exist, on a page, e.g., bringing comments to the title page or moving all annotations to subsequent pages.

The system enables intentional annotations as opposed to mere indexing. Users consciously indicate that they want to add a media-based annotation, just as they consciously indicate ink-based annotations by writing on the paper. The end of a media annotation is as important as the beginning and so the user indicates both the start and the stop of the annotation. The system accommodates user mistakes by providing a way for the user to correct them. The overwriting of media-based annotations is supported and when corrected, the original (e.g., misspoken) annotations are no longer accessible. Thus, as the user interacts with the document, the user's attention remains on the document and the work at hand. The task of coordinating pieces of content is left to the system.

The user is able to leverage all public media stream services that are accessible though the network available at the place where the person is annotating rather than relying solely on those supported by his/her device. If a meeting room has an audio and video streaming service available though a public microphone and camera, and the building has environmental sensors (collecting a data stream for outside temperature and humidity, e.g.), clips from all streams can be attached as annotations to places on the documents. For example, a person could write "It sure is hot and humid in the Deep South in July," and annotate the document with actual data from the stream generated by the building's environmental sensor.

Intentional, multimodal annotations are enabled by system. The notion for the use of paper-based multimodal annotations is that the document user wants to add a specific comment about the existing content on a document. By extending the types of information that can be referenced by an annotation, both personal and collaborative uses for annotations are enriched, especially for shared documents. Electronic annotations that embody a reader's experience with the document convey that experience more richly to subsequent readers and so enhance the ability of the document to communicate.

Reference is now made to FIG. 1. A user accesses, through various different input systems 2a, 2b and/or 2c, a context manager 4 which manages the creation and use of annotations and the tracking and shredding of both virtual and physical media. The context manager interacts with one or more system(s) 6 for tracking virtual media and one or more system(s) 8 for tracking physical media of multimodal documents. The systems 6 and 8 are content management systems and, in part, operate based on instructions from the context manager 4 with respect to multimodal documents. Each of these systems can be a separate full functioning system which provides a variety of independent operational functions such as printing documents, word processing, video creation, and processing, audio creation and processing. These systems can operate in separate domains and be controlled independently by various means such as personal computers, servers, multifunctional devices, smart paper shredders, etc.

The virtual media content management system 6 is coupled to a virtual media shredding subsystem 10 which shreds, by deletion, the virtual media. The physical media content management system 8 is connected to a physical shredding subsystem 12, which shreds by destroying the physical media. The context manager 4 interactively operates with the various virtual media content management system(s) and the physical media content management system(s) to both identify and compile the content of information files for multimodal documents, including various annotations to multimodal documents and to issue shredding instructions and to track the completion of the various shredding operations. Although shown as separate shredding systems, subsystems 10 and 12, each of these subsystems can be part of the content management system(s) for tracking media to which it is connected.

Input system 2a includes a pre-registered, portable Stylus A connected via a network interface 5 to the context manager 4. The pre-registered Stylus A is registered (paired) to one or more media streams on behalf of a specific user or group of users, for example, users in a given department. Input system 2b includes a portable Stylus B connected to a device detector 9 and to a network interface 11. The detector device is also coupled to detect any badge coupled to badge identification device 13 and a microphone 15, a device that is used to create a media stream. The portable Stylus B is not pre-registered to any user. The detector device 9 detects the Stylus B, the microphone 15 and any badge coupled to the badge identification device allowing the pairing at the context manager 4 of Stylus B and the stream generated by the microphone 15, on behalf of the user based on the information communicated to the context manager 4 via the network interface. The pairing is for the duration of the input session or for a determined time period. Other means of user identification can be employed, such as biometric devices employing user retina scans or user finger print scans, etc.

Input system 2c involves input from pre-registered portable Stylus A and portable Stylus B which have been moved from the previous locations, at input systems 2a and 2b, respectively, to input system 2c. The portable pre-registered Stylus A is connected to a network interface 19. Potable Stylus B is connected to the network interface 19 and to a device detector 23, which is also connected to network interface 19. The device detector 23 is connected to badge identification device 25, to microphone 27 and to video camera 29. The portable Stylus B which is not pre-registered to any user is now paired at input system 2c to the streams generated through the microphone 27 and camera 29, on behalf of the user as determined from the badge identification device 25. The user can be the same user identified at input system 2b or a different user. Again, the pairing can be for the duration of the input session at input system 2c or for a defined time period. Any time duration conflicts would be detected and resolved by the context manager 4 for different users of Stylus B.

Various additional styli can be employed by the system and may be both portable and/or non-portable and may be pre-registered and assigned to a specific user(s) or registered to a user for a particular input session or defined time period. The Stylus may also be associated during an input session with media or other systems as available for the input of information into the system (microphones, video cameras, pens, tablets, etc.).

Figure 2:
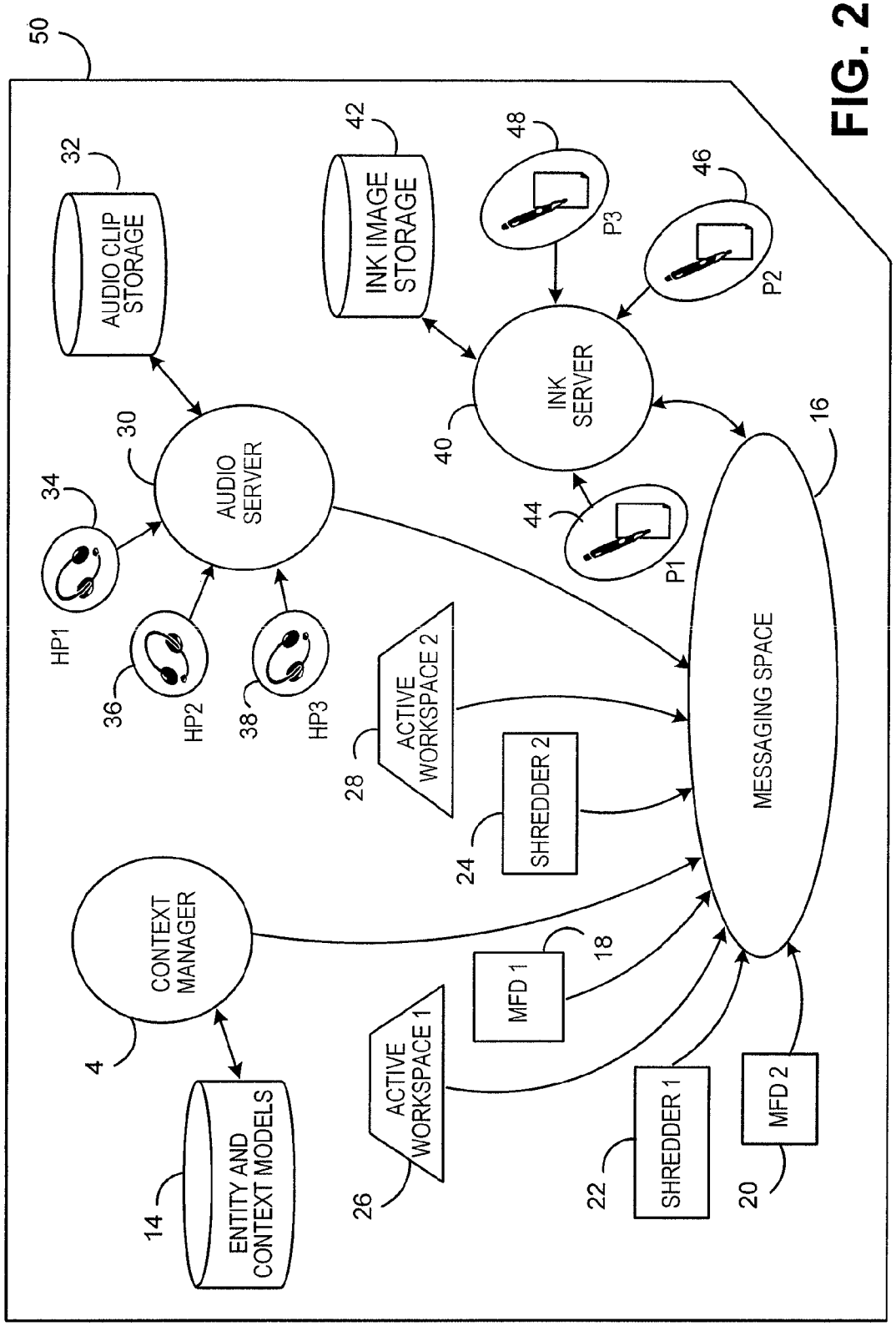
FIG. 2 is a diagrammatic illustration of an example of the system shown in FIG. 1 involving multiple information management domains.

Reference is now made to FIG. 2. The context manager 4 includes a storage means 14 where the information and content data for multimodal documents (entity and context models) and other related information are stored. This includes information communicated from the various input systems such as from input systems 2a, 2b, and 2c shown in FIG. 1. The context manager 4 is coupled via any of a large number of communications systems, here shown as messaging space 16, to various devices and servers. The context manager 4 is connected so that it can span physical locations and various organizations and structures to manage the totality of the multimodal document content, including annotations, and store references to that content in an information and content data file. The multiple domains of use for the multimodal document, as shown in FIG. 2, is such to enable access by the context manager 4 to a plurality of common, potentially associated (such as video and audio), messaging systems and, for example, by shared names for objects that are involved in the various environments. This can include people, devices and documents, both virtual and physical. The domains to which the context manager 4 is connected each incorporate software systems, instrumented devices, spaces and/or procedures that help to create and track multimodal document use including annotations.

The context manager 4 is coupled via the messaging space to multifunctional devices 18 and 20. These may be devices that have been enhanced with one or more document identification technologies, such as radio frequency identification device (RFID) readers, bar code/ANOTO DocId capture, document image capture and hashing. These types of technologies, and others, are employed so that they can identify a pre-existing document that is being printed, scanned or copied. Additionally, these multi-functional devices can create document clones that have been uniquely named, using one of more of these technologies. A printer can create a physical clone of an electronic document while a scanner will do the reverse by taking a physical document and creating an electronic document. Such multifunctional devices can operate to inform the context manager 4, and other subsystems as appropriate, via the messaging space 16, when a document has been cloned.

Shredders 22 and 24 may be normal shredders that have been enhanced with one or more document identification technologies, such as those noted above. Such shredders can operate to inform the context manager 4, and other subsystems as appropriate, via the messaging space 16, when a document has been shredded, that is, physically destroyed, and, should the shredder have a memory, the virtual shredding, that is, the deletion of any relevant information in the shredder related to the multimodal document. An example of one type of shredder with enhanced document identification capability is disclosed in U.S. patent application Ser. No. 11/156,127, filed for B. D. Singer ET AL on Jun. 17, 2006, entitled SYSTEM AND METHOD FOR CONTROLLING THE STORAGE AND DESTRUCTION OF DOCUMENTS and assigned to Pitney Bowes Inc. (Pitney Bowes Docket No. F-933). Active workspaces 26 and 28 may be desks, shelves or other physical places where documents are used that may be enhanced with one or more document identification technologies. These active workspaces 26 and 28 can have additional on-line, active spaces, such as a user's electronic document mailbox, that act similarly to the physical spaces.

There are two primary types of software systems (audio server and ink server) shown in FIG. 2. These systems provide media services and a system that senses and reports events, including the creation of annotation content and the augmentation of an annotation with this content. The audio server 30 manages all of the captured audio media data stream and stores needed information either in its own system storage 32 or on a locally accessed storage. The audio server 30 need not be physically co-located with other subsystems or other domains. Access to the audio server 30 by different users may be implemented through various types of audio input capability, shown at 34, 36 and 38. The ink server 40, like the audio server 30, manages all of the ink media data stream and stores needed information either in its own system storage 42 or through locally accessed storage. The ink server 40 need not be physically co-located with other subsystems or domains being managed by the context manager 4 via the messaging space 16. The ink server 40 can employ digital pens, such as ANOTO pens 44, 46 and 48. The ANOTO pens 44, 46 and 48 may be on users' personal computing space and interconnected to the ink server 40.

There can, of course, be other domains, including other media servers such as those relating to video domains. The architecture of the system shown in FIGS. 1 and 2 can be extended, provided it has the functionality of enabling the context manager 4 to communicate directly or indirectly with the various information domains and servers within those domains are capable of creating content clips, augmenting annotations with those clips, and shredding of multimodal documents. Moreover, the context manager can operate within a secure environment if that is desired, such as a secure building, as denoted by the line 50 encircling the context manager 4 and all of the various domains of control.

As can be seen above, the context manager 4 provides multimodal document compilation. It communicates via the messaging space 16 for messages and data emanating from all of the various information domains it interoperates with and derives the use of each managed multimodal document in each managed domain. For example, when a managed multimodal document is physically printed or annotated, the context manager 4 is informed via the messaging space of this activity. The context manager 4 uses the various messages communicated to it via the messaging space to record multimodal document use information. This can include the creation of document clones via the multifunctional devices and annotations of documents including annotations of document clones. The context manager 4 can obtain information relating to the physical location of documents and annotations, such as via the active workspaces, and the attachment of media clips on virtual or physical documents via the various media servers, such as the audio server 30 and the ink server 40. There may also be other on-line internet or intranet applications, not shown, that communicate with the context manager 4, such as a word processing application used on a personal computer.

For the architecture shown in FIG. 2, the context manager 4 is the single point of control and relies on the various subsystems in the various domains to shred the multimodal documents. As shown in FIG. 2, each of the various servers manages the use of the various activities related to that server. For example, the audio server 30 manages audio clip information but communicates that management functionality via the messaging space 16 to the context manager 4. Thus, the context manager 4 remains the single point of control for annotations of multimodal documents and for tracking, issuing shred commands and monitoring shredding activity. Other architectures can also be implemented where the single point of control is modified to provide additional or separate points of control for separate types of subsystems or separate categories of multimodal document virtual media and/or physical media.

The system mitigates the need for human intervention when annotating or shredding a multimodal document in the system. The shredding of multimodal documents is more fully described in the above noted provisional patent application Ser. No. 60/909,273 entitled "SYSTEM AND METHODS FOR MANAGING MULTIMODAL DOCUMENTS." The context server may also possess greater knowledge of the context than individual systems and users of the multimodal document because of the span of domains about which the context server stores or can access data. The system is organized for the context manager to communicate with various domains of control related to the multimodal document so that it is able to initiate and, depending on how the system is implemented, monitor and/or confirm, modification, annotation and/or the shredding of a multimodal document including renditions and earlier annotations associated with the document. Thus, the system manages documents that exist in both the physical and electronic environment.

Figure 3:
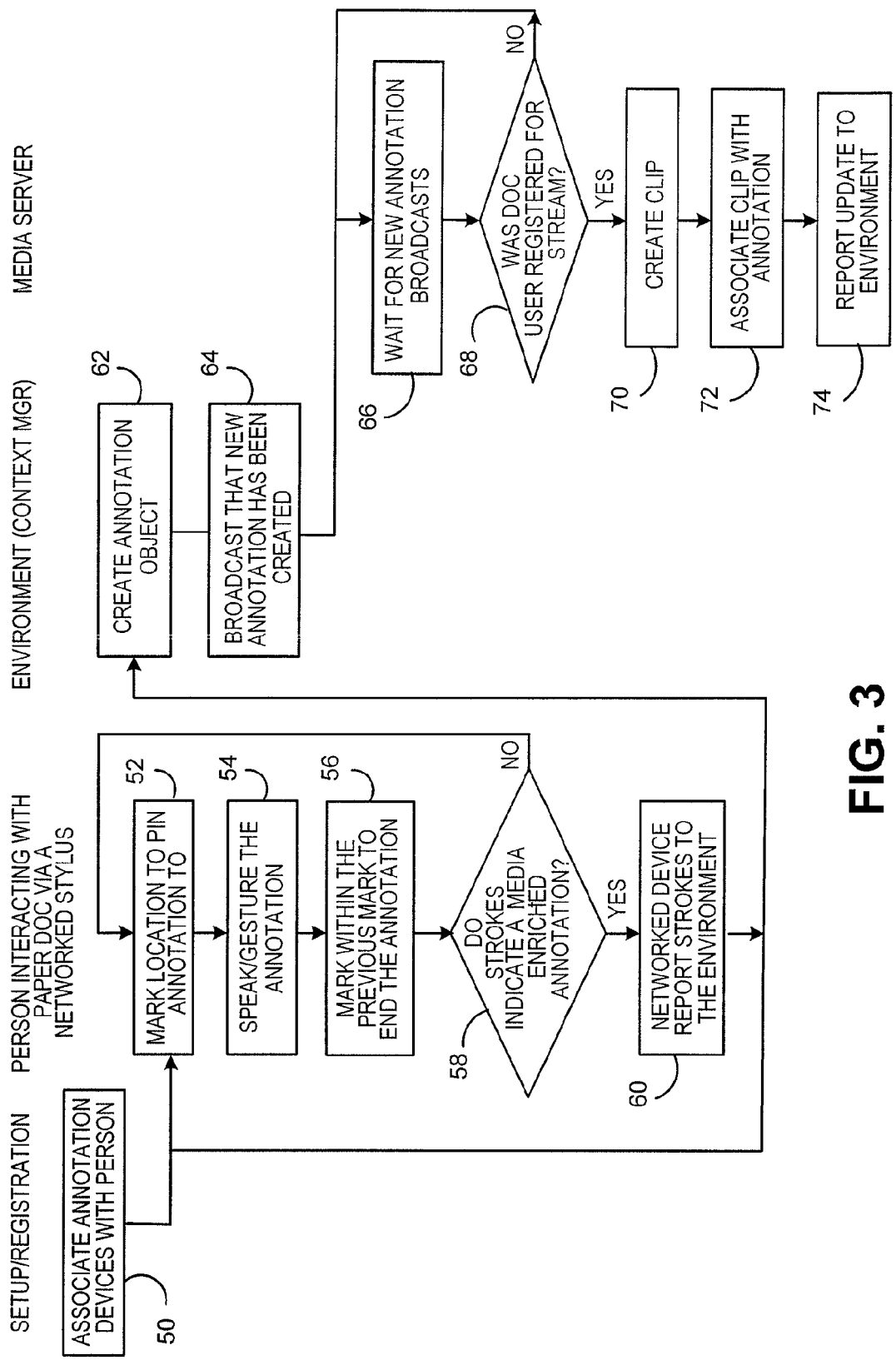
FIG. 3 is a flow chart of the operation of the system shown in FIG. 1 involving the process for collaborative capture and replay of digital media files using multimodal documents, including managing annotations of multimodal documents which includes setup and registration, interaction via a networked stylus, the operating environment and the associated media servers.

Reference is now made to FIG. 3 showing the operation of the system. Certain steps in the flow chart of FIG. 3 are shown in greater detail in subsequent figures. Although a pen is used as the stylus in a number of process steps, other stylus types as referenced in the definition of stylus may be employed taking into account the media type employed in the annotation. Moreover, although specific media types are employed in a number of process steps, other media types as disclosed herein may also be employed.

At block 50, an annotation device, e.g., a pen and a microphone are associated with a person (a specific user). At block 52, the location to which the annotation is to be pinned is marked and at block 54 the annotation clip, such as speaking, video, capture of gestures, etc., is created. At block 56, the annotation is marked within the previous mark to end the annotation. A determination is made at block 58 if the strokes indicate a media enriched annotation. Where the strokes do not indicate a media enriched annotation, the process loops back to block 52. Where the strokes do indicate a media enriched annotation, the network device reports the strokes to the environment at block 60.

The process loops back to block 52 and further continues with the creation of an annotation object at block 62. At block 64, a broadcast is made that a new annotation has been created. The broadcast of this information is to all media servers, through message space 16, as noted in FIG. 1. Each media server was previously awaiting these broadcasts as shown in block 66. When a new annotation broadcast is received by a media server, a determination is made at block 68 whether the document user was registered for the server. If the document user was not registered, the process loops back to block 66. Where the document user was registered, the process continues at block 70, where the clip is created, and the clip is then associated with the annotation referenced in the broadcast message at block 72 and an update is reported to the operating environment at block 74.

Figure 4:
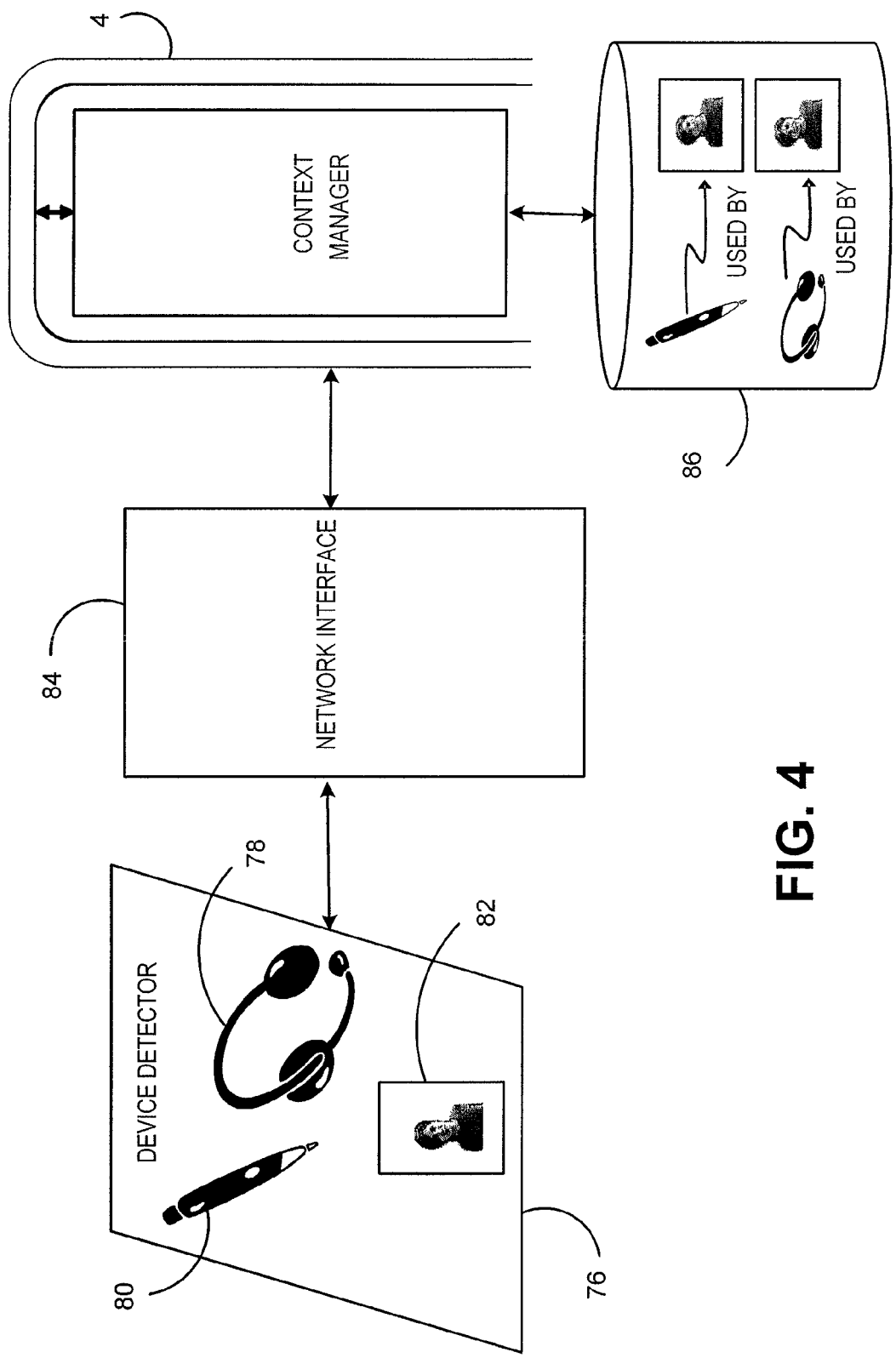
FIG. 4 is a diagrammatic illustration of associating annotation devices with a person.

Reference is now made to FIG. 4. At block 76, a microphone 78 and an Anoto pen 80, which are associated with particular media streams for various servers, are identified and associated with an individual (user) identified by badge 82. This information is communicated via a network interface 84 to the context manager 4. The context manager 4 is coupled to a storage means 86 where information is stored that the Anoto pen 80 is being used by the individual identified by badge 82 and that the microphone 78 is being used by the person identified by badge 82. This information may be time stamped so that not only the use of the device Anoto pen 80 and microphone 78 is noted, but also the time at which the device(s) has/have been used is noted. These devices are considered paired, on behalf of the person identified by badge 82.

Figure 5:
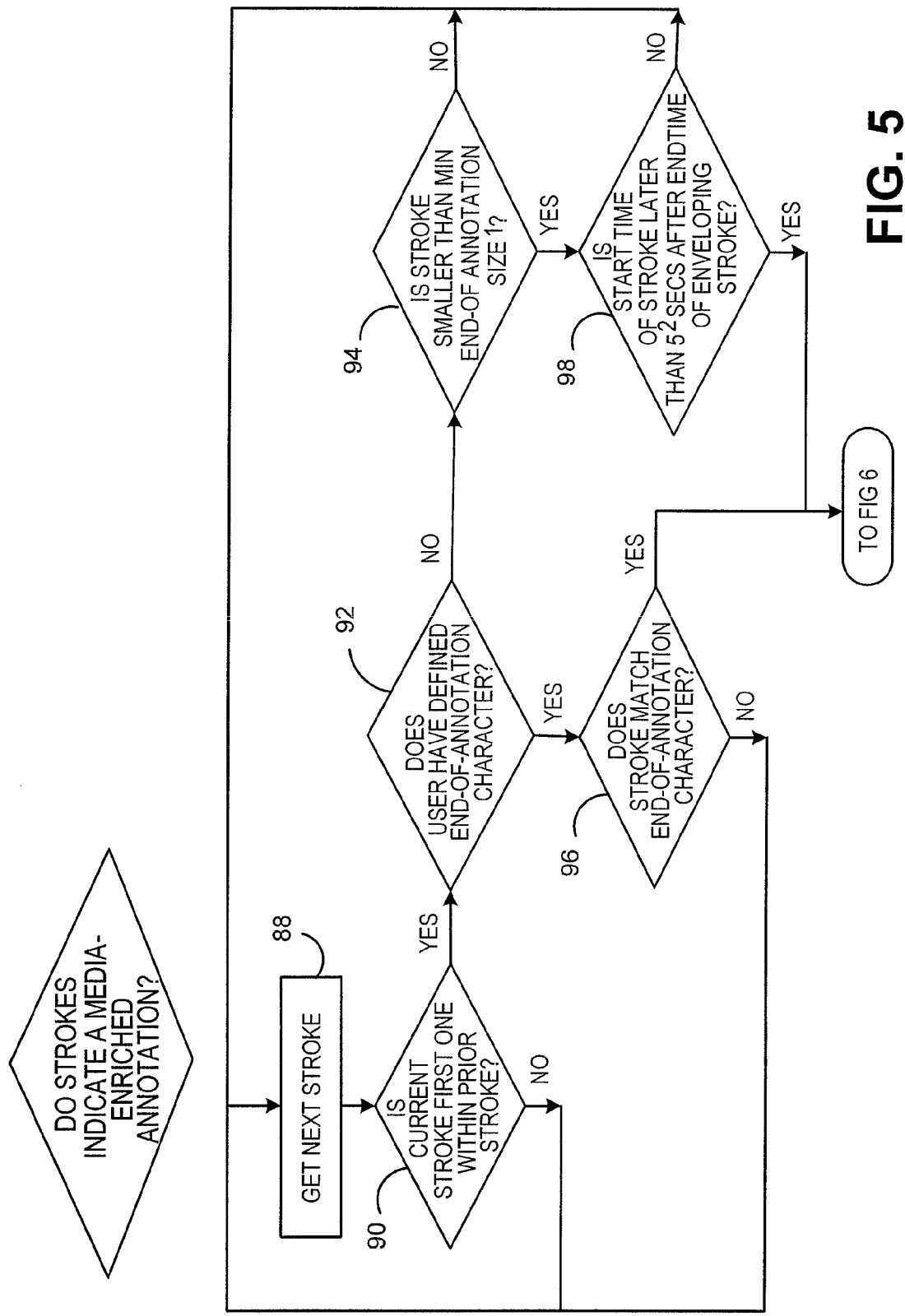
FIG. 5 is a flow chart detailing the process for determining whether strokes indicate a media enriched annotation.
Figure 6:
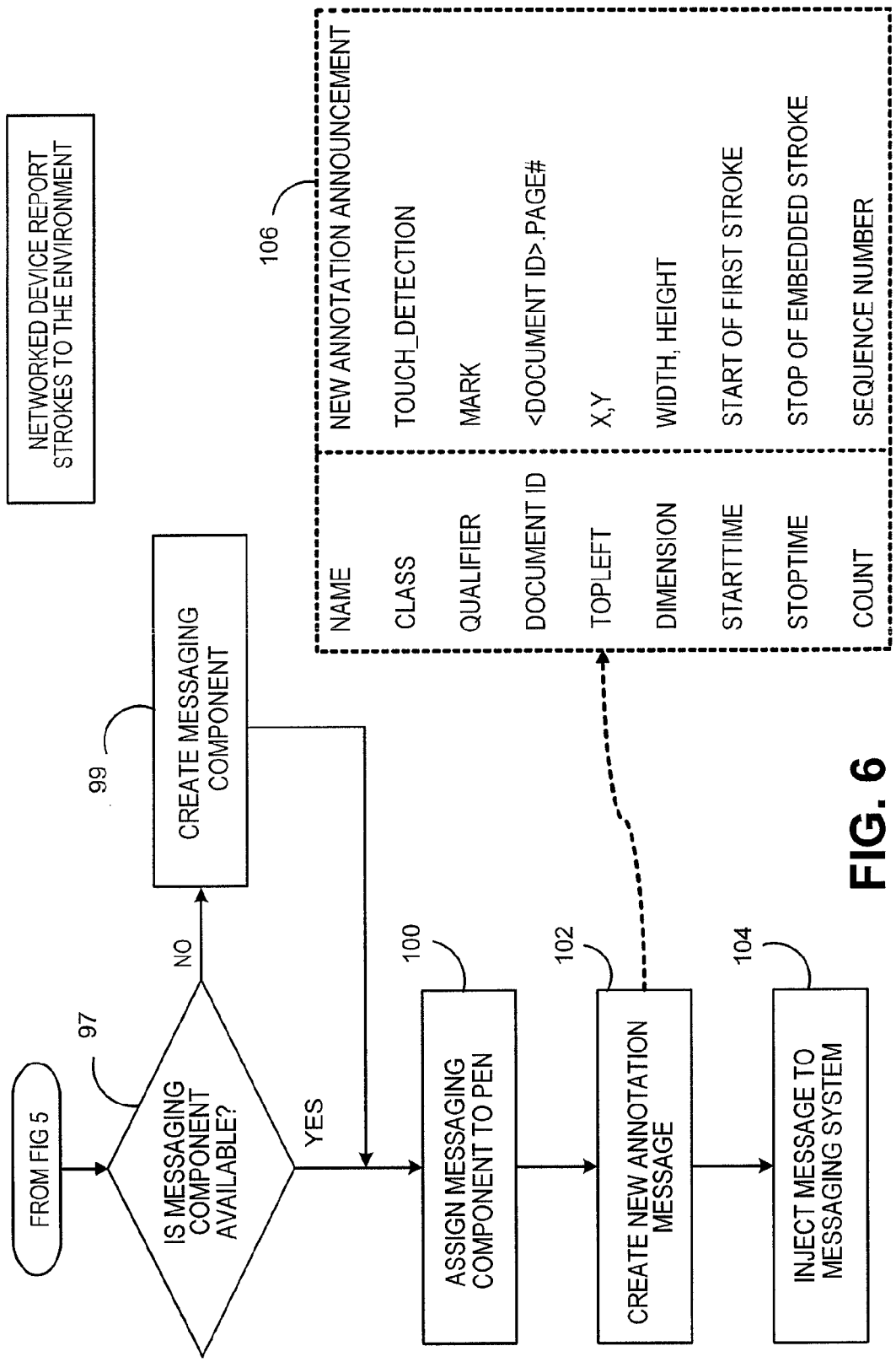
FIG. 6 is a flow chart detailing the process for the networked device reporting strokes associated with a media enriched annotation to the environment.

Reference is now made to FIG. 5. At block 88, the next stroke is obtained. This is the next stroke of the Anoto pen 80 or other input device being used by the person to whom it is registered. A determination is made at block 90 if the current stroke is the first stroke within a prior stroke. If the prior stroke is the initial stroke which delimits the starting point and starting time for the annotation and where the current stroke is within the prior stroke, the current stroke delimits the end of the annotation. Where the current stroke is not the first stroke within a prior stroke, the process loops back to block 88 to get the next stroke. However, where the current stroke is the first stroke within a prior stroke, the process continues to block 92. At block 92, a determination is made if the user has defined an end of annotation character. That is, the user has defined a specific character that denotes the end of an annotation.

Where the user has not defined a specific character that denotes the end of an annotation, the process continues at block 94 and a determination is made if the stroke is smaller than the minimum end of annotation size. The annotation size is set to a minimum size so that scratch outs and overwrites can be filtered out. The end of annotation stroke is assumed to be a single character, for example, in a standard font size (e.g., 12 point). Where the stroke is not smaller then the minimum end of annotation size, the process continues and loops back to block 88. However, if the stroke is smaller then the minimum end of annotation size, the process continues at block 98. At block 98, a determination is made as to whether the start time of the stroke is later than 5 seconds after the end time of the prior stroke. The 5 seconds is a preconfigured "think" time that helps to discriminate between input information, like a dot for an 'i', and annotation end points. The actual number of seconds can be set according to user preferences. Where the start time of the stroke is not later then this time period (5 seconds), the process again loops back to block 88. However, where the start time of the stroke is later then this time period (5 seconds), the process continues, as shown in FIG. 6 where the networked device reports the strokes to the environment. Thus, this process determines if the stroke indicates a media enriched annotation by analyzing the size and timing of the user strokes to determine if annotation ink content is being added or if the stroke is an indication of the end of a digital media annotation.

When, at block 92, a determination is made that the user does have a defined end of annotation character, a further determination is made at block 96 whether the stroke matches the end of annotation character. Where the stroke does not match the end of annotation character, the process loops back to block 88. However, where the stroke does match the end of annotation character, the process continues as shown in FIG. 6 where the networked device reports the strokes to the environment.

Reference is now made to FIG. 6. A determination is made at block 97 if the messaging component is available. If the messaging component is not available, a message component is created at block 99 and the process continues at block 100, where a messaging component is assigned to a pen. At block 102, a new annotation message is created and the message is injected into the messaging system at block 104. It should be noted that the creation of a new annotation message may include the information shown in block 106. This can include Name, Class, Quantifier, Document Identification, Top Left (location reference), Dimension, Start Time, Stop Time and Count (sequence number). Examples for the types of designation for each item of information are shown in block 106. Other formulations may be employed to meet the needs of the users and requirements of the particular system involved.

Figure 7:
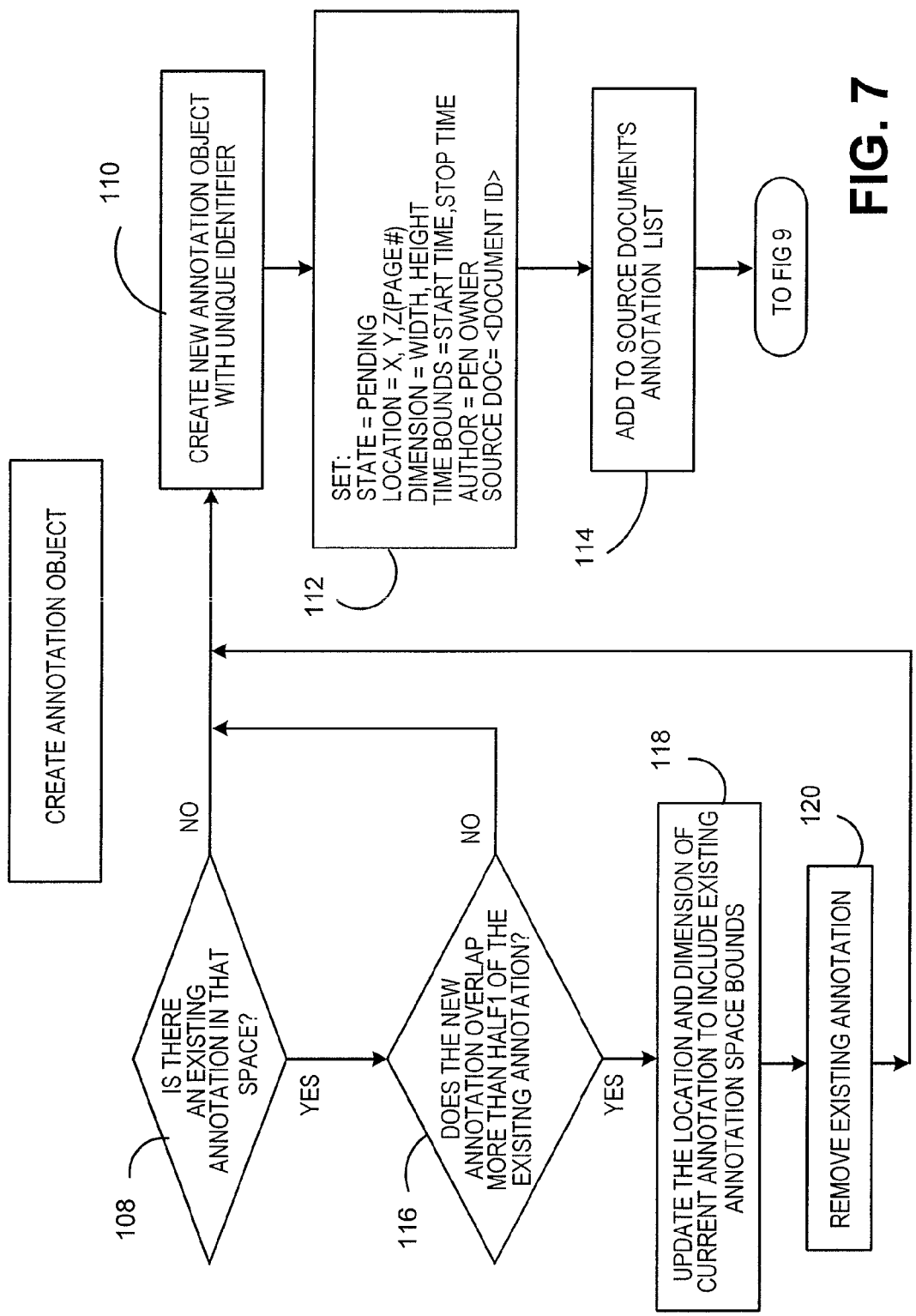
FIG. 7 is a flow chart detailing the process for creating an annotation object.

Reference is now made to FIG. 7. The creation of the annotation and associating it with a document includes a determination at block 108 if there is an existing annotation in that space. Where no annotation exists in that space, a new annotation object with unique identifier(s) is created at 110. The new annotation may include, as shown at block 112, the State, Location, Dimension, time Bounds, Author, Source Document, and/or other information and, at block 114, it is added to the source document's annotation list. Where at block 108 it is determined that an annotation exists in that space, a further determination is made at block 116 if that new annotation overlaps more than half of the existing annotation. Where a new annotation overlaps more than half of the existing annotations, an update of the local dimensions of the current annotation is made to include existing annotation space bounds at block 118 and at block 120, existing annotations are removed. The process then loops back to block 110. Where at block 116 the new annotation does not overlap more than half the existing annotation, the process loops back to block 110.

Figure 8:
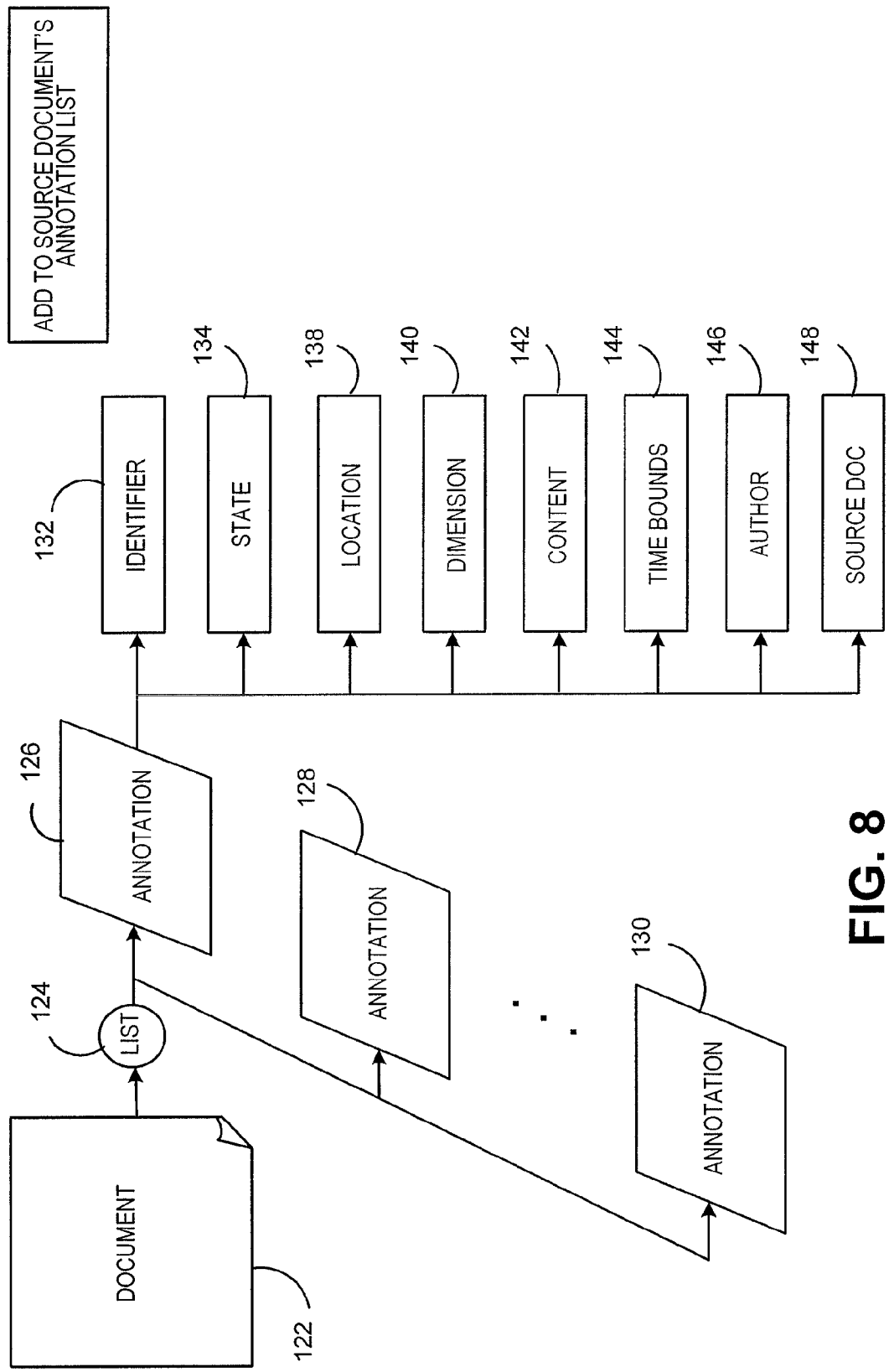
FIG. 8 is a diagrammatic illustration of adding to a source document annotation list.

Reference is now made to FIG. 8. The system includes a model for document annotations in which a given multimodal document is uniquely identified and is associated with one or more annotations. Each annotation includes a unique identifier and description of where on the document the annotation in pinned (location/dimension). A document 122 has an associated list of annotations 124. The list of annotations 124 can include annotation 126, annotation 128 through a plurality of annotations to annotation 130. Each annotation, such as annotation 126, has a series of attributes that are captured. The attributes may include an annotation Identifier 132, State 134, Location 138, Dimensions 140, Content(s) 142, Time Bounds 144, Author 146 and Source Document 148. The Content(s) 142, when being created does not contain a mime file. A mime file, that is, a file denoting the format or type of the media clip, will be added at the conclusion of the creation of the annotation and may be listed with other previously created media clips.

Figure 9:
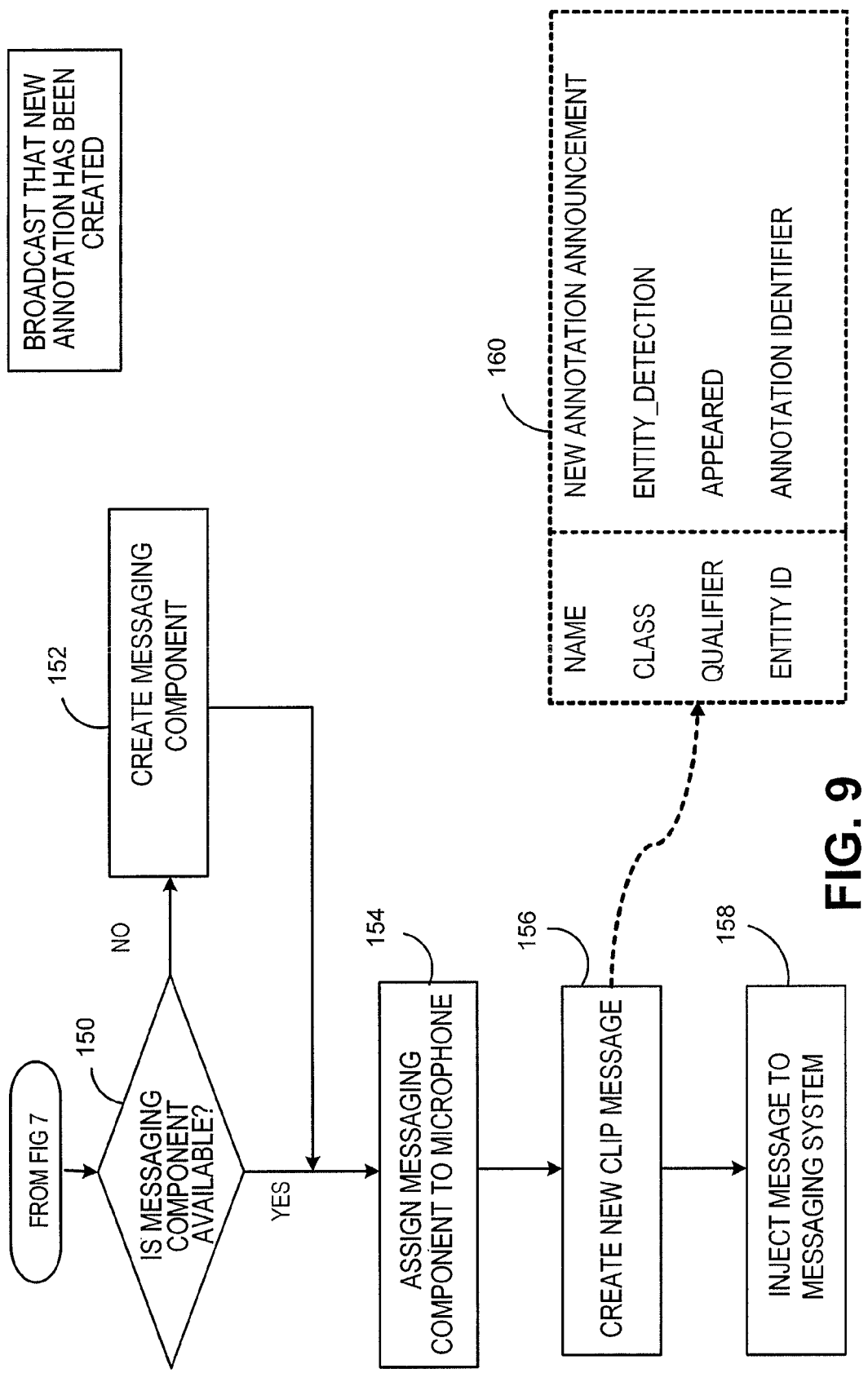
FIG. 9 is a flow chart detailing the process broadcasting that a new annotation has been created.

Reference is now made to FIG. 9. When a broadcasting message annotation has been created, a determination is made at block 150 if a messaging component is available. Where no message component is available, at block 152, a messaging component is created. The process continues at block 154. The process also continues at block 154 when at block 150 it is determined that a messaging component is available. At block 154 the messaging component is assigned such as to a microphone and, at block 156, a new message clip is created. At block 158, the message is injected into the messaging system. The created message clip at block 156 may include, as is shown in block 160, attributes including Name, Class, Qualifier, and Entity Identification for the annotation 126 shown in FIG. 8.

Figure 10:
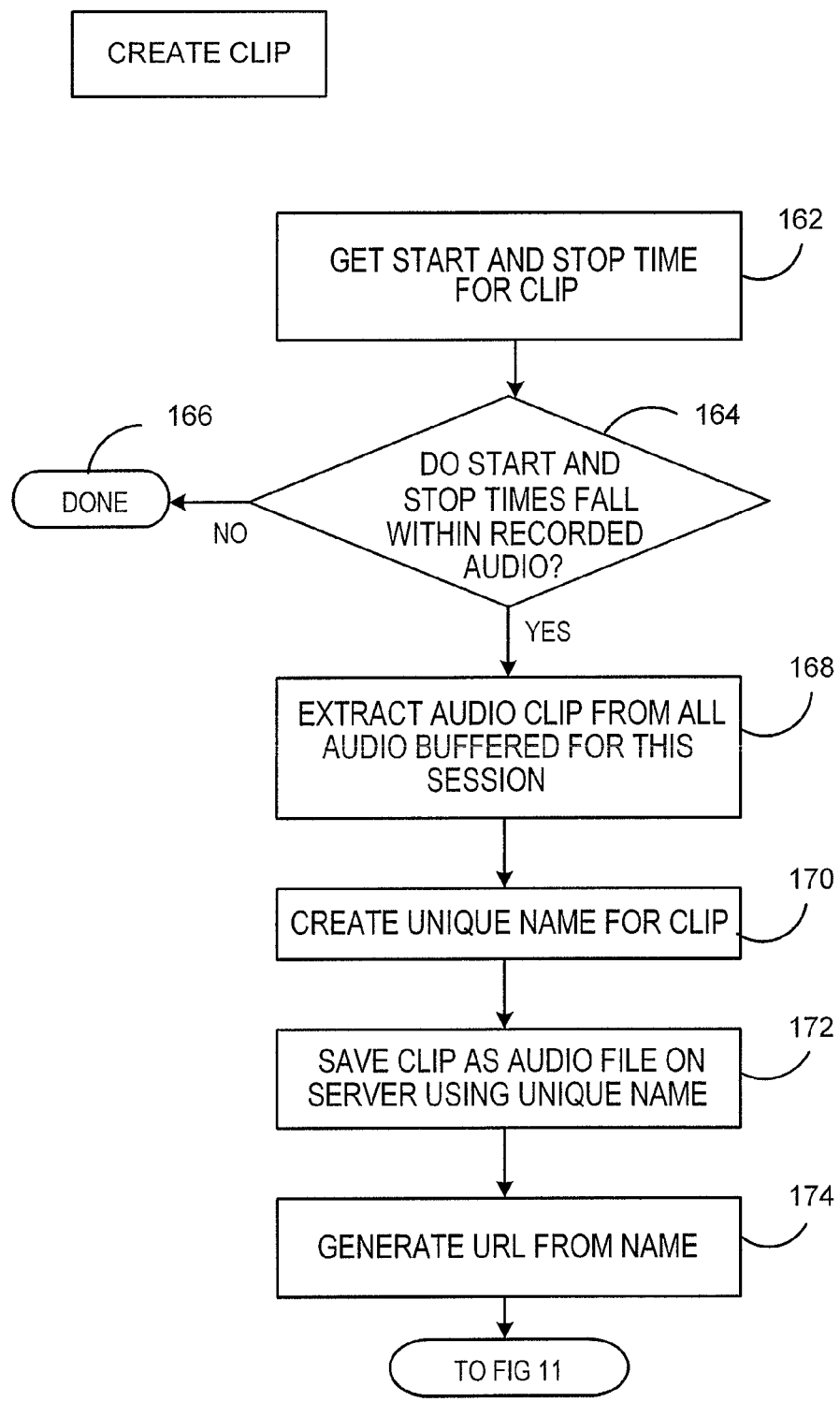
FIG. 10 is a flow chart detailing the process for creating a delimited segment of the media stream (clip)

Reference is now made to FIG. 10, where a media clip is created. At block 162, start and a stop time for the clip is obtained. A determination is then made at block 164 if the start and stop times fall within the media stream such as a recorded audio. When the start and stop times do not fall within the recorded audio, the process ends at block 166. However, when the start and stop times do fall within the recorded audio, at block 168, the audio clip is extracted from all audio which may be buffered for the session. At block 170, a unique name for the clip is created and at block 172, the clip is saved as an audio file on a server using the unique name as a reference for retrieval. At block 174, a URL is generated from the name. The process then continues as shown in FIG. 11 where the clip is associated with an annotation.

Figure 11:
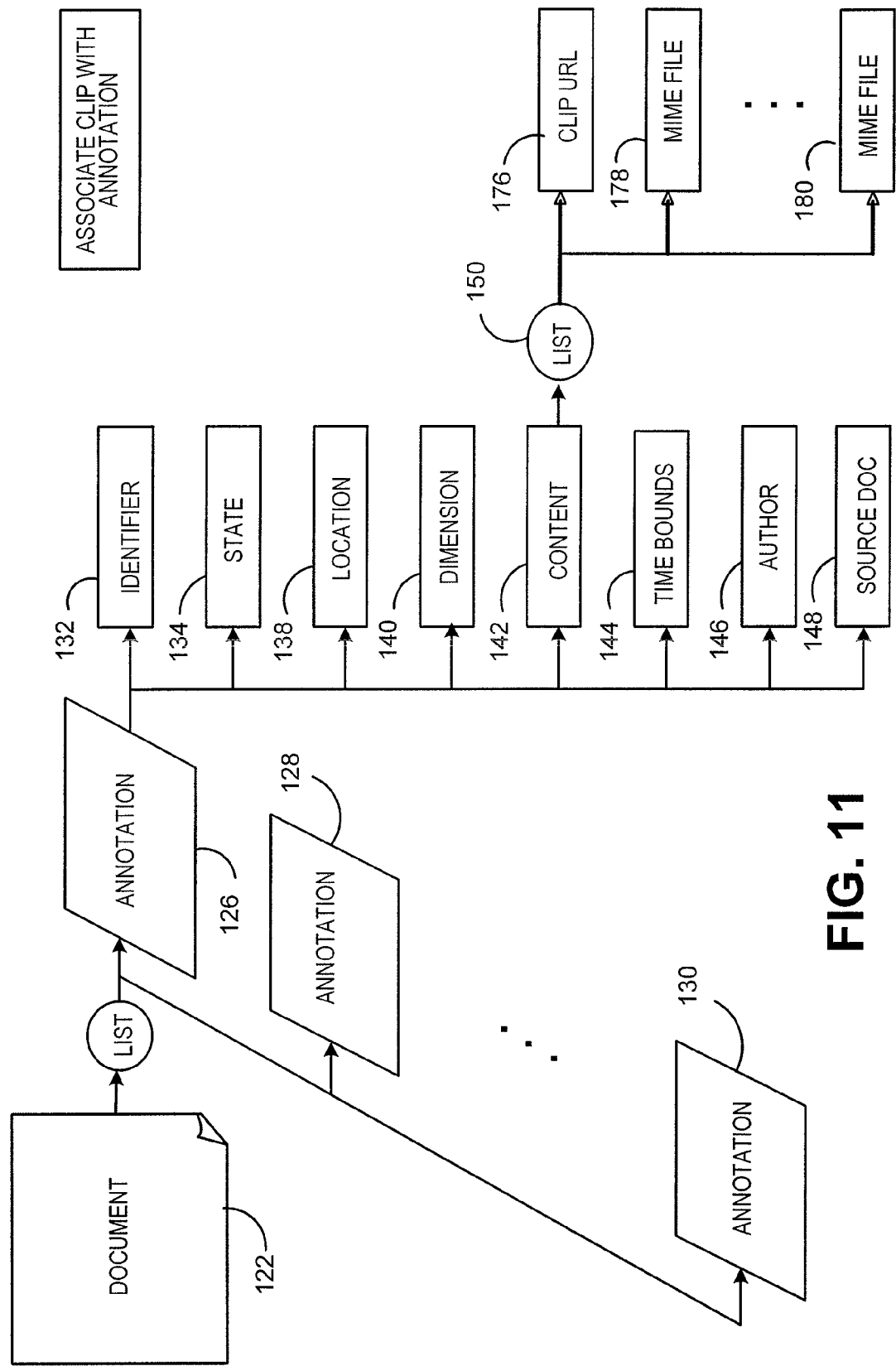
FIG. 11 is a diagrammatic illustration of associating a clip with an annotation.

Reference is now made to FIG. 11. FIG. 11 includes the content of FIG. 8, however, the annotation clips have already been created. Thus, a further content list 150 is associated with the content attribute 142. The list 150 includes various files showing the type of each content for the clip. This can include, for example, URL at block 176 and various other types of content file types, added by other media servers, which would be included in the mime files 178 through a plurality of mime files 180.

Figure 12:
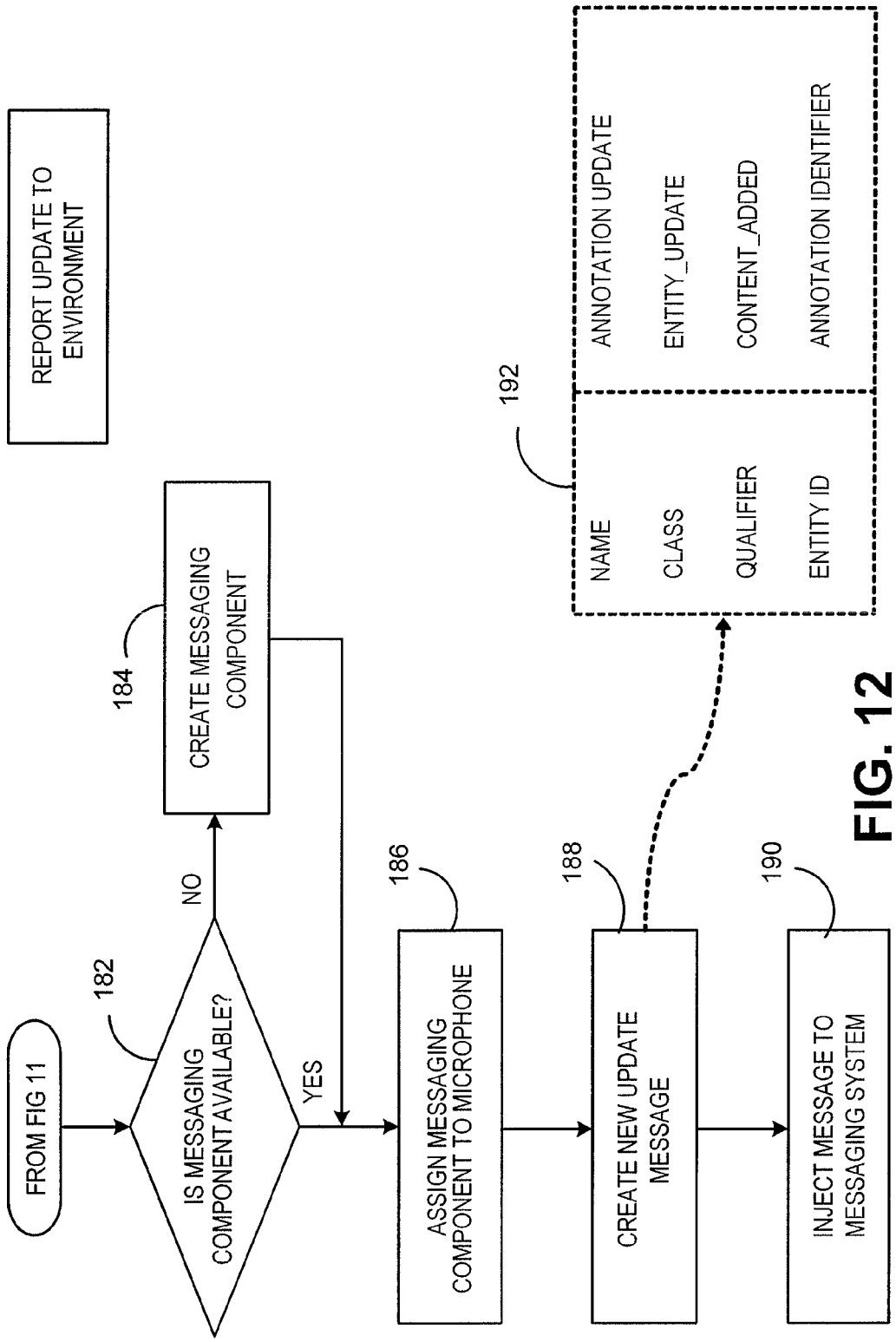
FIG. 12 is a flow chart detailing the process for reporting an annotation update to the environment.

Reference is now made to FIG. 12, where a report is made to update the environment. A determination is made at block 182 if a messaging component is available. Where no messaging component is available, a messaging component is created at block 184 and the process continues at block 186. When at block 182 it is determined that a messaging component is available, the process also continues at block 186. At block 186 a messaging component is assigned to a media device such as the microphone. At block 188, a new, updated message is created. The message is injected into the messaging system at block 190. The new, updated message created may have attributes as shown in block 192. These attributes can include Name, Class, Qualifier and Entity Identification.

Figure 13:
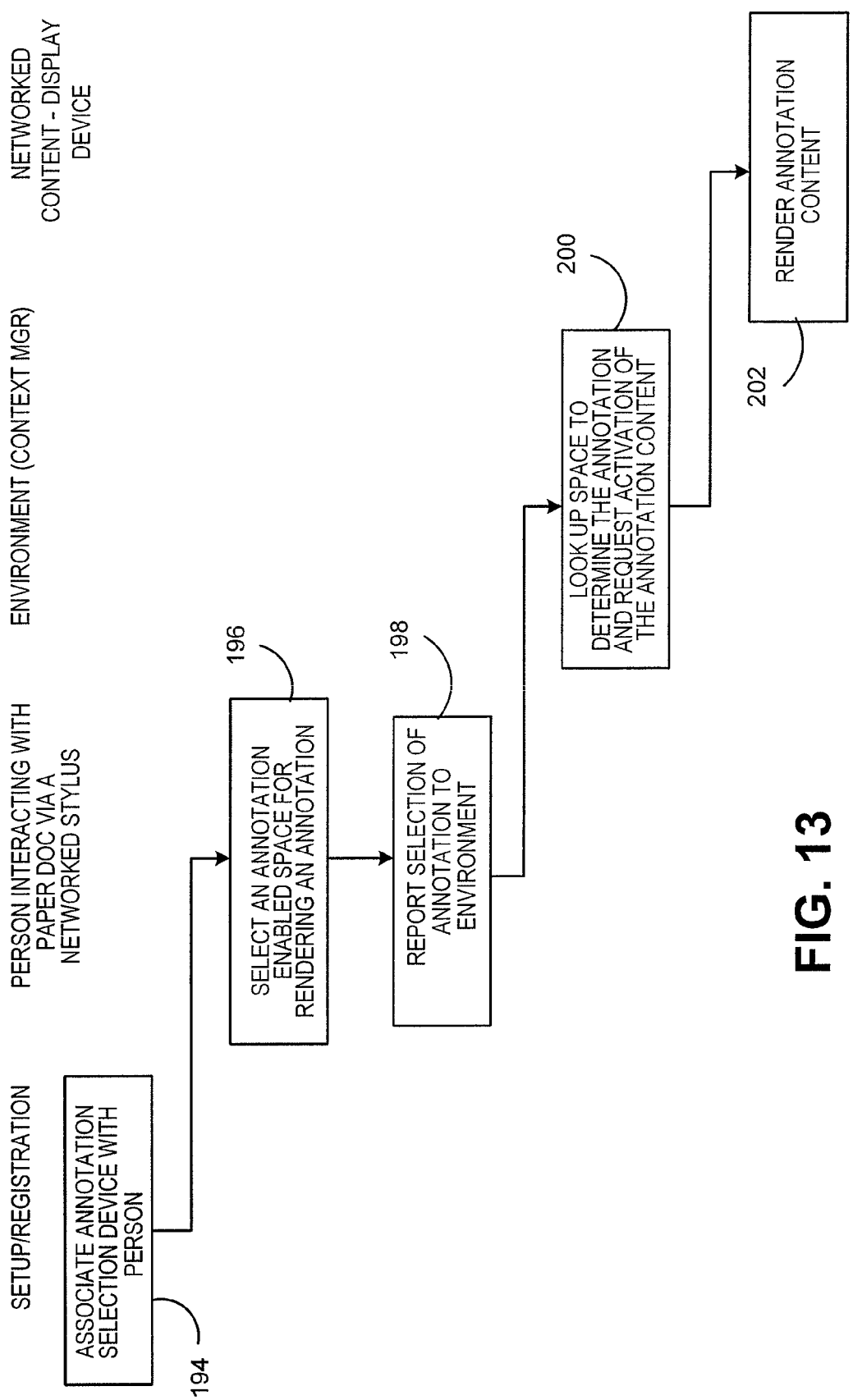
FIG. 13 is a flow chart of the operation of the system shown in FIG. 1 involving the rendering of annotation content using multimodal documents, including managing multimodal document annotation renderings which includes setup and registration, interaction via a networked stylus, the operating environment and the associated network content-display devices.

Reference is now made to FIG. 13 showing the overall process for rendering annotation content using multimodal documents. Certain steps in the flow chart of FIG. 13 are shown in greater detail in subsequent figures. Although a pen for the used as the stylus in a number of process steps, other stylus types as referenced in the definition of stylus may be employed taking into account the media type employed in the annotation. Moreover, various media types may also be employed in the various process steps. Audio clips are played back to a user's active audio speakers. Video clips are displayed on the user's active display. Ink/environment information clips are displayed on the user's display. The system can be configured, for example, such that the user need only touch/click a screen showing a document within the area of the annotation to replay the annotation.

At block 194, an annotation selection device is associated with a person (user). At block 196, an annotation-enabled space for rendering an annotation is selected. At block 198, the selection is reported to the operating environment. At block 200, the space is looked up to determine the annotation and activation of the annotation content is requested. The annotation content is then rendered at block 202.

Figure 14:
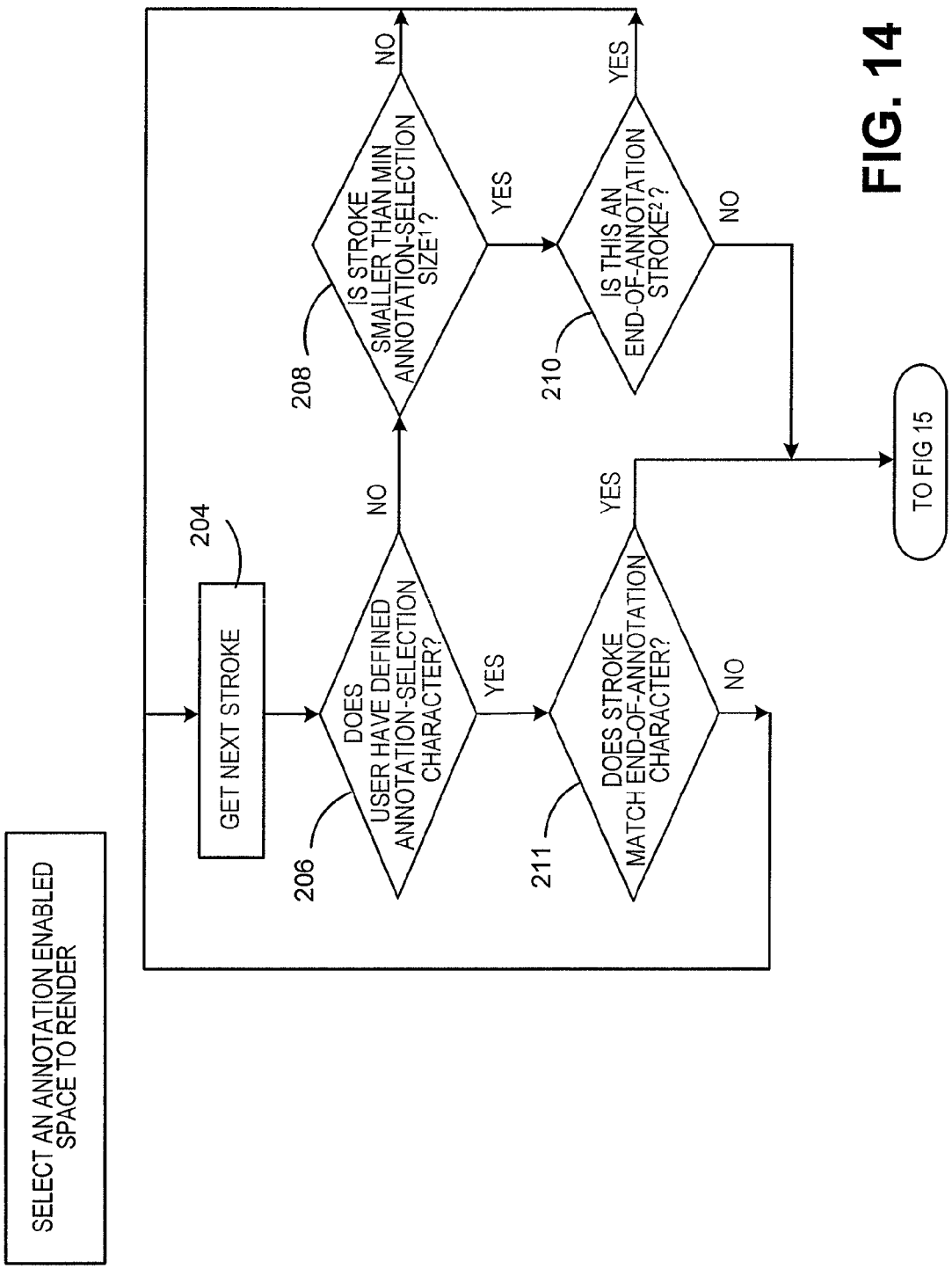
FIG. 14 is a flow chart detailing the process for selecting an annotation enabled space for rendering an annotation.
Figure 15:
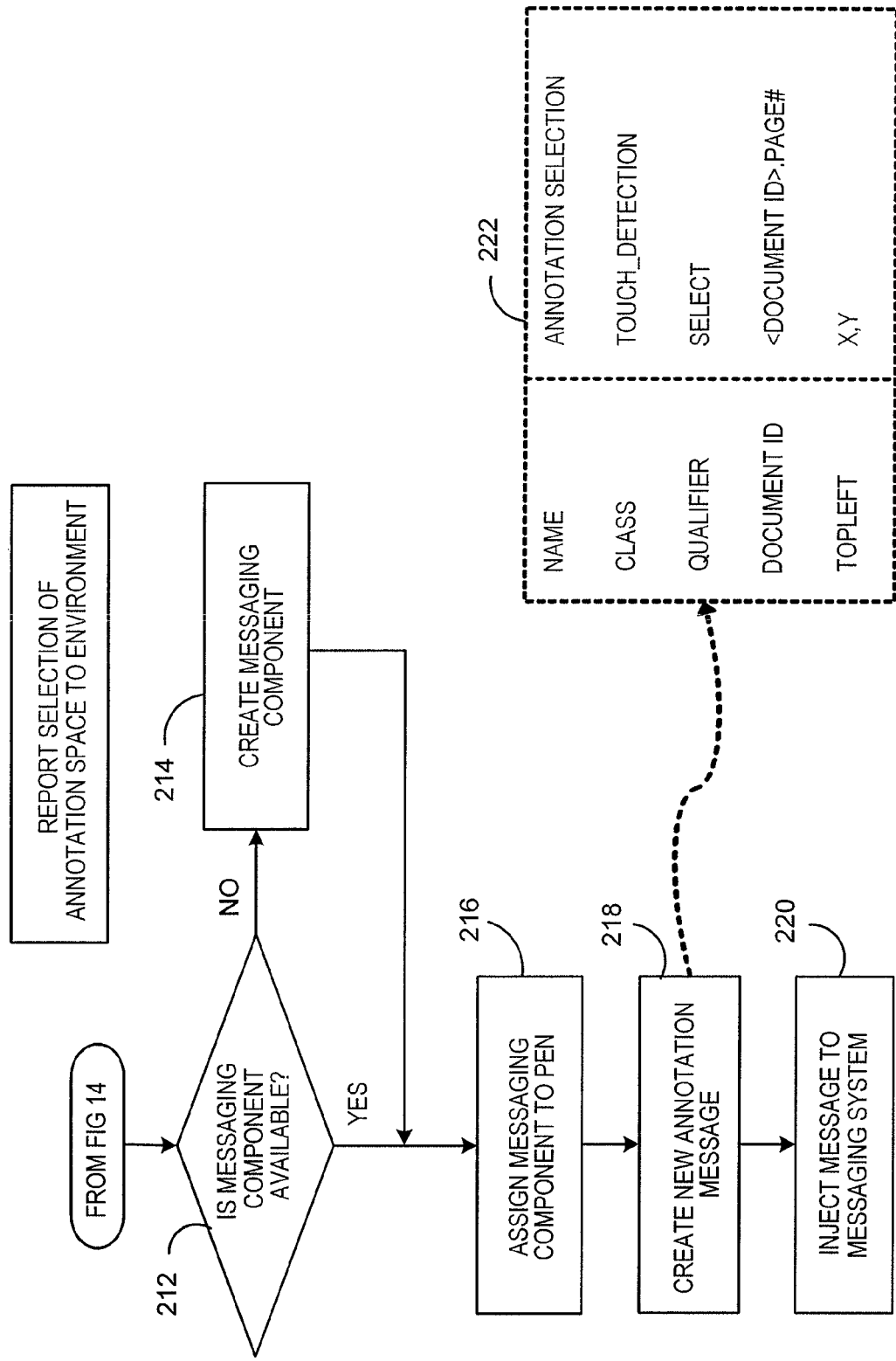
FIG. 15 is a flow chart detailing the process for reporting the selection of an annotation space to the environment.

Reference is now made to FIG. 14. The selection of an annotation-enabled space to render commences with getting the next stroke at block 204. A determination is then made at block 206 if the user has defined an annotation selection character. If the user has not selected an annotation selection character, a determination is made at block 208 if the stroke is smaller than the minimum annotation selection size. The minimum annotation selection size is determined either through system configuration or user preference, and acts to differentiate annotation selection from ink overwrites and "scratch-outs." The annotation selection stroke is assumed to be a single character, for example, in a standard font size (e.g., 12 points). Where the stroke is not smaller than the minimum annotation selected size, the process loops back to block 204. Where the stroke is determined to be smaller than the minimum annotation selection size, a further determination is made at block 210 if this is an End of Annotation stroke. The stroke will qualify as an end of annotation stroke if it is the first embedded stroke that satisfies the criteria for the end of annotation stroke. Where this is an end of annotation stroke, the process loops back to block 204. Where this is not an end of annotation stroke, the process continues, as shown in FIG. 15 to report selection of annotation space to the environment. Where at block 206 a determination is made that the user has a defined annotation selection character, a determination is made at block 211 if the stroke matches the end of annotation selection character. Where the stroke does not match the end of annotation character, the process loops back to block 204. Where the stroke matches the end of annotation character, the process continues as shown in FIG. 15.

Reference is now made to FIG. 15, where the selection of an annotation space is reported to the environment. A determination is made at block 212 if a messaging component is available. Where no messaging component is available, a messaging component is created at block 214 and the process continues at block 216. When at block 212 it is determined that a messaging component is available, the process also continues at block 216. At block 216, the messaging component is assigned to a pen and a new annotation message is created at block 218. The message is injected into the messaging system at block 220. The attributes of the new annotation message is shown at block 222 and can include Name, Class, Qualifiers, Document Identification, and TopLeft.

Figure 16:
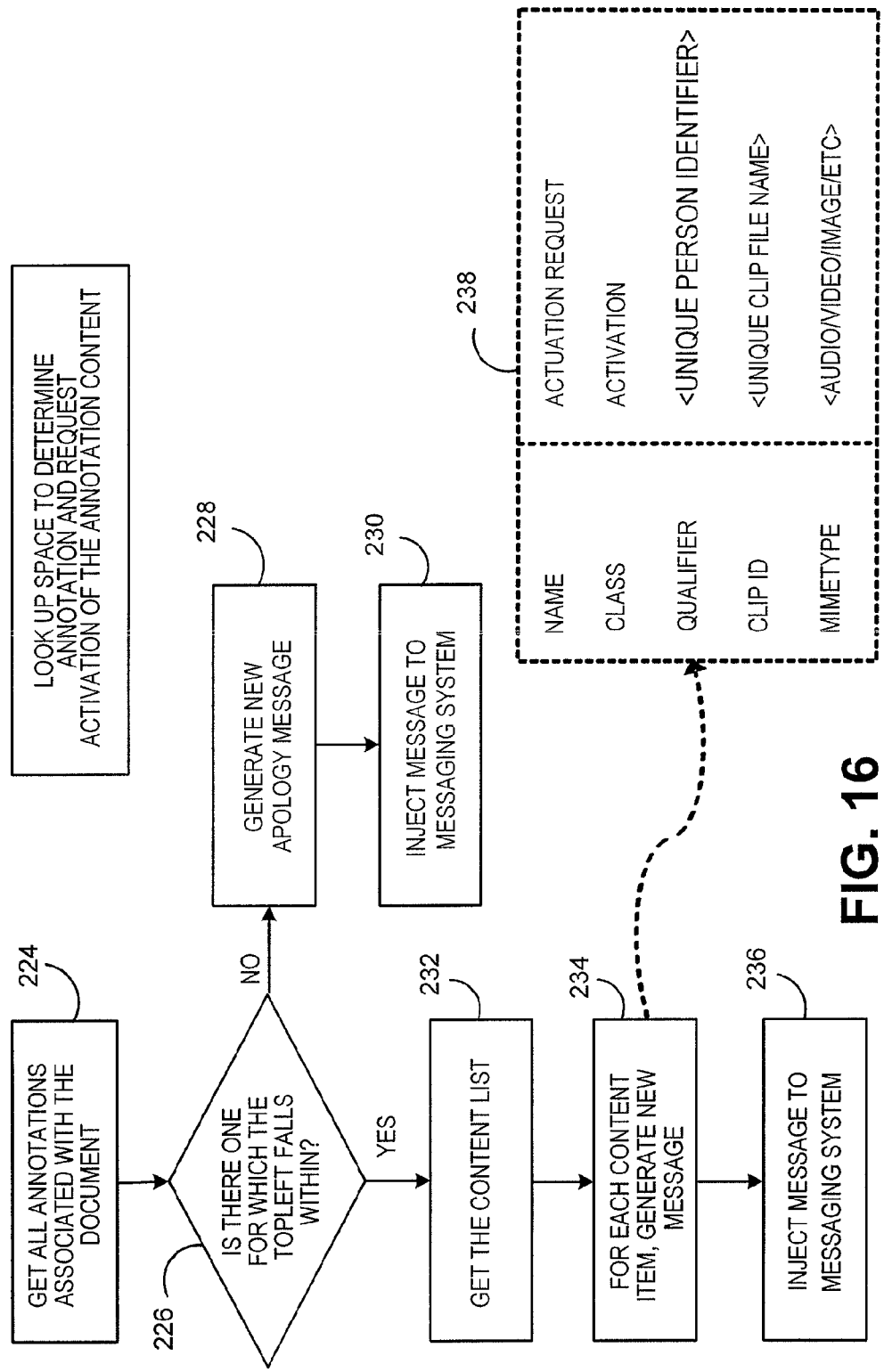
FIG. 16 is a flow chart detailing the process for looking up an annotation associated with the selected annotation space and requesting the activation of the annotation content; and, FIG. 17 is a flow chart detailing the process for rendering annotation content.

Reference is now made to FIG. 16, where the space to determine the annotation is looked up and activation of the annotation content is requested. At block 224, all annotations associated with the document are obtained. A determination is then made at block 226 if there is an annotation which falls within the space of the document such as the top left. Where the annotation does not fall within this particular space, a new apology message (such as no annotation located) is generated at block 228 and the message is injected into the messaging system at block 230. Where, however, at block 226 it is determined that there is an annotation which falls within the particular space such as top left, the content list is obtained at block 232 and, for each content item, a new message is generated at 234. The message is injected into the messaging system at block 236. The new message may have message attributes including Name, Class Qualifier, Clip Identification and Mime Type.

Figure 17:
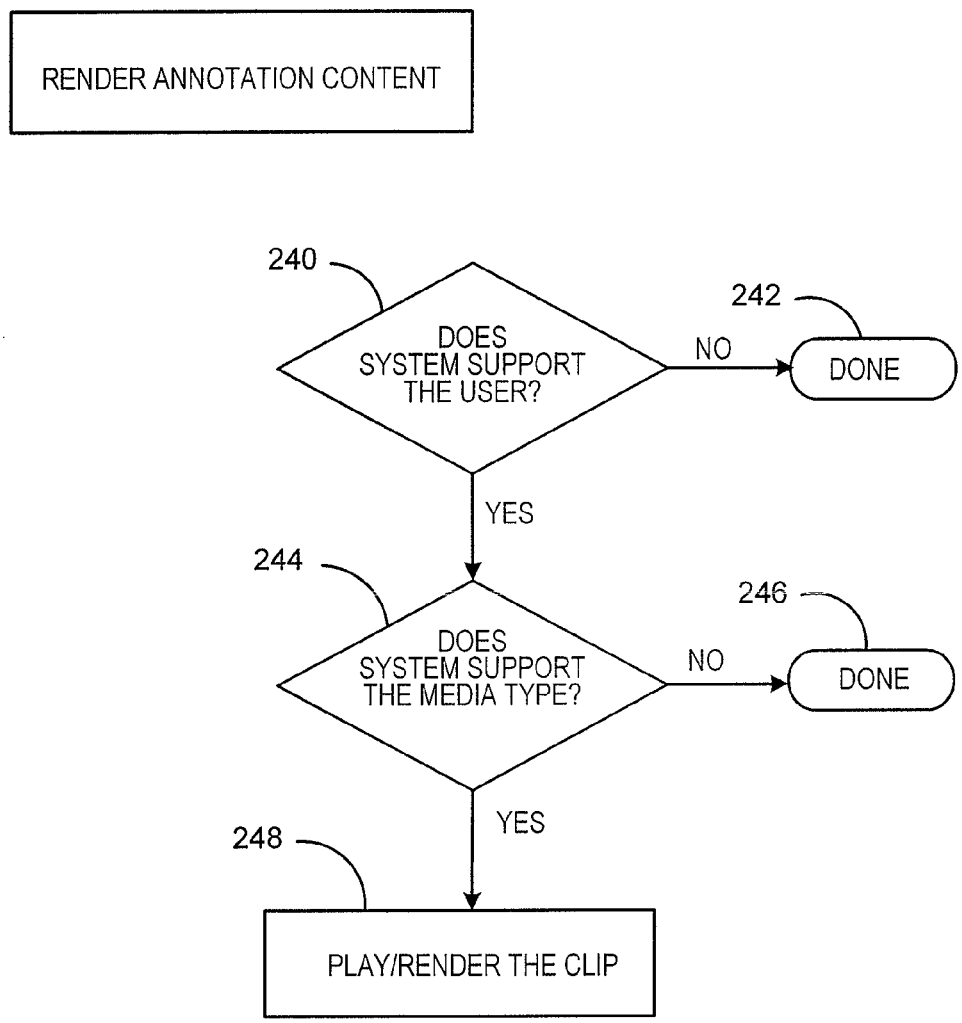

Reference is now made to FIG. 17, where the annotation content is rendered. A determination is made at block 240 if the annotation rendering/display system supports the particular user (requestor). Where the system does not support the particular user, the process terminates at block 242. Where the system does support the particular user, a determination is made at block 244 as to whether the system supports for rendering the particular the media type. Where the system does not support the particular media type, the process terminates at block 246. However, where the system does support the particular media type, the clip is rendered and played at block 248.

Since all networked content display/play back devices may receive the message injected into the system, as shown in FIG. 16, each networked content display/play back device determines whether it supports the user and whether it supports the media type. Where the system supports the user and the media type, the media clip is rendered by the media device when activated by the user. When a determination is made that the networked media device does not support the particular media type and/or particular user, the process ends for that particular networked media device.

The system described above provides flexibility in its operation. One example of the operation of the system described above is where annotations are placed on a document using a stylus, such as a specialized service provided with digital pen technology. To associate annotations with electronic content, the pen user first marks an area on a digitized document. This mark indicates the place and the beginning time for the annotation. When the user finishes his/her comment, a mark may be added within the original mark. The digital pen service determines the placement of the annotation by seeing the overlaid marks, and it determines the appropriate time limits (begin and end) by using the start time of the initial stroke and the end time of the embedded stroke. Since both audio and visual information takes time to convey, the pen service filters out strokes that are embedded quickly within another, e.g., dotting an 'I'. The user may be allowed, if desired, to define strokes that better identify the intended annotations.

Another example of the operation of the system is the remote, collaborative review of a document. One reviewer can add annotations to his copy of a document. These annotations then become immediately available to a second reviewer, using an electronic shadow document. The second reviewer can refer to the electronic shadow, select the place of the annotation on the second reviewer's physical document, and hear/see the first reviewer's attached media clip. This collaboration can happen in real time, or it can happen staggered in time. If staggered in time, the second reviewer need not refer to the electronic shadow, but can instead create an annotated physical copy, that includes the markings from the first reviewer.

This system enables collaborative multi-modal annotation using a digitized stylus interface to define and "pin" media clips to content within a document. The system dynamically binds the stylus to media producers, using, for example, an instrumented surface that responds to the presence of the stylus and token for the media producer. The system provides interpretation of standard user interactions which determine time delimits of the media clip, to extract the portion of the media stream of interest. The system also provides a protocol used between the digitizing stylus interface and the media source for creating and attaching clips to the content of the document. The system provides a document model that represents and stores the annotations within portions of the document. This model enables real-time sharing of clips among multiple parties annotating, including simultaneously annotating the document. It also supports access to specified clips at a later time.

While the present invention has been described in connection with what is presently considered to be the most practical and preferred embodiments, it is to be understood that the invention is not limited to the disclosed embodiment, but, on the contrary, is intended to cover various modifications and equivalent arrangements included within the spirit and scope of the appended claims.

What is claimed is:

1. A computer implemented system for enabling capture and replay of digital media files using multimodal documents, comprising:
    a context manager computer system for managing multimodal documents;
    a virtual media content management computer system, said virtual media content management system coupled to said context manager and containing digital content which is adapted to be managed by said virtual media content management system;
    an input system, said input system coupled to said context manager and including a stylus, said stylus operable to select digital content to processed, and said stylus dynamically paired with a media source, wherein said media source provides media data annotations of the multimodal documents; and,
    said context manager configured to issue multimodal document management instructions to said virtual media content management system to process digital content selected by said stylus based on input information from said input system.

2. A system for enabling capture and replay of digital media files using multimodal documents as defined in claim 1, wherein said stylus is associated with a stylus user by registering said stylus and said user through data communicated to said context manager.

3. A system for enabling capture and replay of digital media files using multimodal documents as defined in claim 2, wherein said input system further includes a media system and wherein said stylus is further operable to be associated with a media system by dynamically registering said stylus and said media system through data communicated to said context manager during an input session with said input information generated by said media system.

4. A system for enabling capture and replay of digital media files using multimodal documents as defined in claim 3, wherein said media system includes a microphone for capturing audio information.

5. A system for enabling capture and replay of digital media files using multimodal documents as defined in claim 3, wherein said media system includes a video camera for capturing viewable information.

6. A system for enabling capture and replay of digital media files using multimodal documents as defined in claim 3, wherein said media system includes an electronic tablet for capturing input stroke information.

7. A system for enabling capture and replay of digital media files using multimodal documents as defined in claim 3, wherein said media system includes an electronic pen for capturing information.

8. A system for enabling capture and replay of digital media files using multimodal documents as defined in claim 3, wherein said media system includes an interface device and wherein said stylus is further operable to be associated with a media system by dynamically registering said stylus and said media system interface device through data communicated to said context manager during an input session with said input information generated by said media system.

9. A system for enabling capture and replay of digital media files using multimodal documents as defined in claim 2, wherein said input system further includes a plurality of media systems and wherein said stylus is further operable to be associated with each of said plurality of media systems by dynamically registering said stylus and each of said plurality of said media systems through data communicated to said context manager during an input session with said input information generated by said plurality of media systems.

10. A system for enabling capture and replay of digital media files using multimodal documents as defined in claim 2, wherein said stylus is registered prior to said stylus being employed to select digital content to processed.

11. A system for enabling capture and replay of digital media files using multimodal documents as defined in claim 2, wherein said stylus is dynamically registered when said stylus is being employed to select digital content to process.

12. A system for enabling capture and replay of digital media files using multimodal documents as defined in claim 2, wherein said input system coupled to said context manager includes a plurality of styli, each of said plurality of styli operable to select digital content to processed and each of said plurality of styli registered to a different user.

13. A system for enabling capture and replay of digital media files using multimodal documents as defined in claim 12, wherein said input system further includes a media system and wherein each of said plurality of styli is further operable to be associated with a said media system by dynamically registering each of said plurality of styli and said media system through data communicated to said context manager during an input session with said input information being generated by said media system.

14. A system for enabling capture and replay of digital media files using multimodal documents as defined in claim 1, further including a plurality of input systems, each of said plurality of input systems coupled to said context manager and each of said plurality of input systems adapted to be associated with a stylus, said stylus operable to select digital content to processed.

15. A system for enabling capture and replay of digital media files using multimodal documents as defined in claim 14, wherein each stylus of each of said plurality of input systems is portable, is associated with a stylus user by registering said stylus and said user through data communicated to said context manager and is adapted to be associated with other input systems coupled to said context manager to select digital content to be processed by said other input systems.

16. A system for enabling capture and replay of digital media files using multimodal documents as defined in claim 1, wherein said media source comprises a microphone that captures audio information.

17. A system for enabling capture and replay of digital media files using multimodal documents as defined in claim 1, wherein said media source comprises a camera that captures video information.

18. A system for enabling capture and replay of digital media files using multimodal documents as defined in claim 1, further comprising:
   a second input system, said second input system coupled to said context manager and including a second stylus, said second stylus operable to select digital content to processed, and said second stylus paired with a second media source.

19. A system for enabling capture and replay of digital media files using multimodal documents as defined in claim 1, further comprising:
   a second input system, said second input system coupled to said context manager and including a second stylus, said second stylus operable to select digital content to processed, and said second stylus paired with the media source.

20. A system for enabling capture and replay of digital media files using multimodal documents as defined in claim 1, further comprising:
   said stylus is unpaired from the media source; and
   said stylus is then paired to a second media source.

21. A system for enabling capture and replay of digital media files using multimodal documents as defined in claim 1, wherein,
   said dynamic pairing is for a first period of time.

* * * * *